US012639051B2

(12) United States Patent
Wu et al.

(10) Patent No.: US 12,639,051 B2
(45) Date of Patent: May 26, 2026

(54) SYSTEM AND METHOD FOR DETERMINING FACTORS AFFECTING DATA ASSOCIATED WITH USER INTERFACE FEATURES

(71) Applicant: Shopify Inc., Ottawa (CA)

(72) Inventors: Christopher Wu, Toronto (CA); Medhat Husni Kabbara, Seattle, WA (US)

(73) Assignee: Shopify Inc., Ottawa (CA)

( * ) Notice: Subject to any disclaimer, the term of this patent is extended or adjusted under 35 U.S.C. 154(b) by 35 days.

(21) Appl. No.: 18/314,854

(22) Filed: May 10, 2023

(65) Prior Publication Data

US 2024/0378031 A1      Nov. 14, 2024

(51) Int. Cl.
*G06F 8/38* (2018.01)
*G06F 8/41* (2018.01)

(52) U.S. Cl.
CPC ............... *G06F 8/38* (2013.01); *G06F 8/433* (2013.01)

(58) Field of Classification Search
CPC .................................. G06F 8/38; G06F 8/433
See application file for complete search history.

(56) References Cited

U.S. PATENT DOCUMENTS

| | | | |
|---|---|---|---|
| 2011/0145748 A1* | 6/2011 | Farver ...................... | G06F 8/71 |
| | | | 715/771 |
| 2015/0277723 A1* | 10/2015 | Banerjee ................... | G06F 8/36 |
| | | | 715/763 |
| 2019/0235843 A1* | 8/2019 | Wu ........................... | G06F 8/35 |
| 2020/0160190 A1* | 5/2020 | Swamy ................ | G06F 40/279 |
| 2020/0250230 A1* | 8/2020 | Abhyankar ......... | G06F 16/9535 |

* cited by examiner

*Primary Examiner* — Stephen S Hong
*Assistant Examiner* — Darrin Hope
(74) *Attorney, Agent, or Firm* — CPST Intellectual Property Inc.; Brett J. Slaney

(57) ABSTRACT

A system and method to determine factors providing inputs that affect values of associated data are provided. The method includes detecting incorporation in a user interface of a user interface feature having associated data; determining, from a data dependency model comprising a representation of a directed graph having nodes representing factors, the factors including at least one indirect factor, and edges representing factors providing inputs to other factors, at least one factor providing an input that affects values of the associated data; and presenting one or more of the at least one factor.

20 Claims, 20 Drawing Sheets

| Node | Drivers | Direct or Ind | Formula |
|---|---|---|---|
| net_profit | operating_profit | Direct | net profit = operating profit - taxes - expenses |
| net_profit | taxes | Direct | net profit = operating profit - taxes - expenses |
| net_profit | interest | Direct | net profit = operating profit - taxes - expenses |
| gross_profit | revenue | Indirect | gross profit = revenue - COGS |
| gross_profit | cogs | Indirect | gross profit = revenue - COGS |
| cogs | variable_costs | Direct | |
| variable_costs | product_purchase_price | Direct | |
| variable_costs | labor_costs | Direct | |
| variable_costs | shipping_logistics | Direct | |
| product_purchase_price | quantity | Direct | |
| product_purchase_price | supplier | Indirect | |
| product_purchase_price | season_of_purchase | Indirect | |
| operating_profit | gross_profit | Direct | operating profit = gross profit - operating expenses |
| operating_profit | operating_expenses | Direct | operating profit = gross profit - operating expenses |
| labor_costs | wages | Direct | |
| labor_costs | productivity | Indirect | |
| revenue | aov | Direct | revenue = aov x # of orders |
| revenue | num_orders | Direct | revenue = aov x # of orders |
| num_orders | traffic | Direct | num_orders = traffic x conversion |
| num_orders | conversion | Direct | num_orders = traffic x conversion |
| aov | basket_size | Direct | aov = avg basket size x avg item price |
| aov | item_price | Direct | aov = avg basket size x avg item price |
| traffic | organic_traffic | Direct | |
| traffic | paid_traffic | Direct | |

FIG. 9

SYSTEM AND METHOD FOR DETERMINING FACTORS AFFECTING DATA ASSOCIATED WITH USER INTERFACE FEATURES

TECHNICAL FIELD

The following generally relates to user interface features having associated data, in particular to determining factors providing inputs that affect values of the associated data, and yet more particularly to determining such factors from a data dependency model.

BACKGROUND

Software features that convey data-driven information, and which are incorporated into a user interface (UI), are often developed (or added to the UI) without any checks or validations that the designer has considered or conveyed sufficient related information and data in their design and UI.

BRIEF DESCRIPTION OF THE DRAWINGS

Embodiments will now be described with reference to the appended drawings wherein:

FIG. 9 shows a portion of a data dependency model stored in a tabular form.

DETAILED DESCRIPTION

Figure 1:
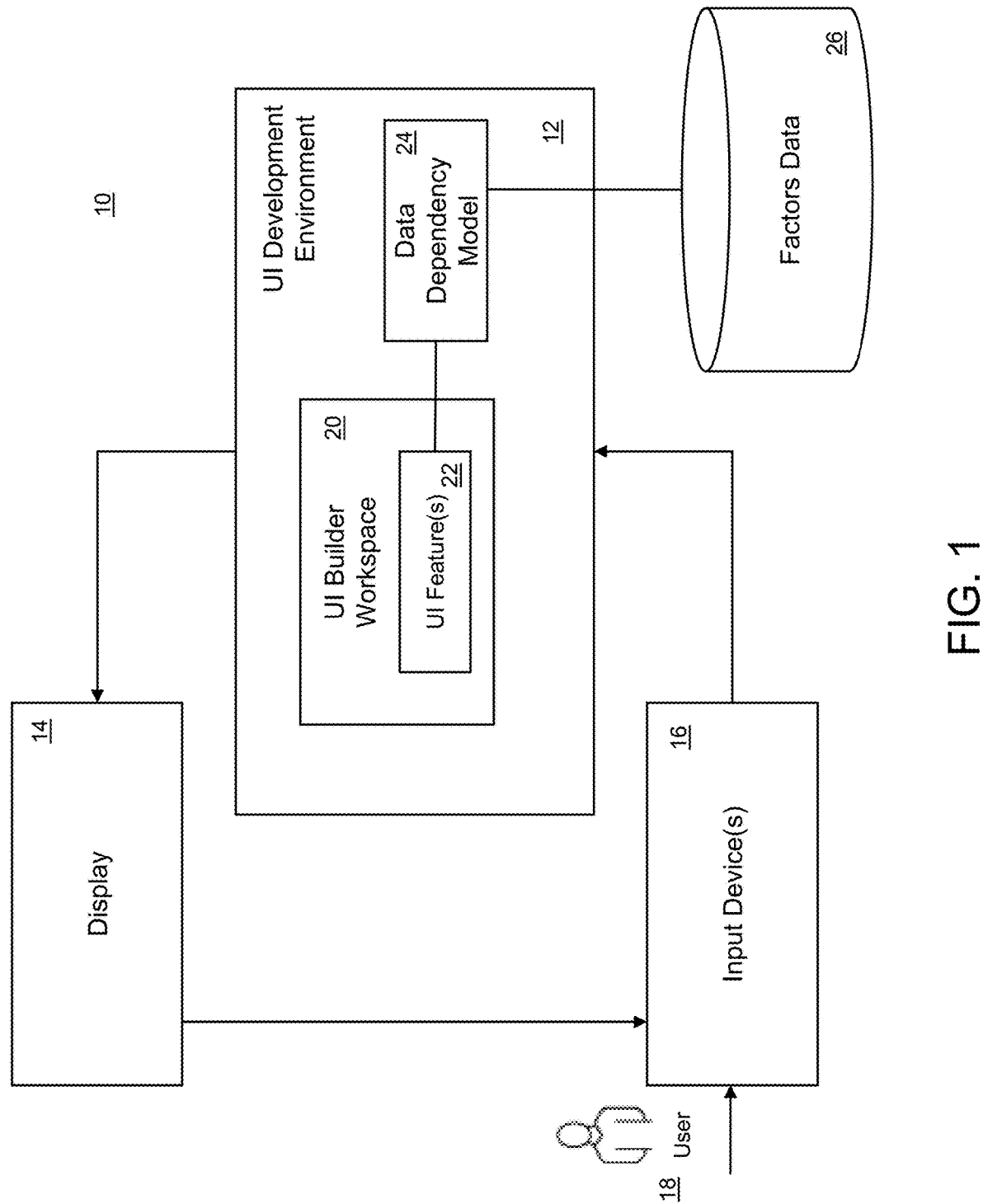
FIG. 1 is an example of a computing environment in which a UI development environment having a UI builder workspace is provided.

It may be desirable to include checks or validations that a designer has considered or conveyed related information and data in a software feature being added or created (e.g., a sufficient set of factors) in their design and UI. For example, when incorporating such a software feature into the UI, certain factors that affect the values presented via the software feature may be important to have, e.g., by presenting the factors in the UI, or providing access to such factors, from a reliable and consistent source. In this way, a user of the UI may determine which factors are influencing the data they see in the software feature and be able to understand or investigate relationships between the factors and/or which inputs impact the underlying data. Similarly, the UI may be designed to incorporate additional software features that include information associated with the factors.

To identify factors that affect a software feature in a UI (hereinafter also referred to as a "UI feature"), the relationships between factors (and the underlying data) may be mapped to each other in a computer-readable data structure. This allows the designer to validate and/or prioritize the inclusion of such factors that are inputs which affect the values being conveyed in the UI feature.

The factors and their interrelationships may be provided using a data dependency model, which, in the examples provided herein, provides a representation that maps how different metrics and levers (herein referred to as the "factors") fit together. The data dependency model may be used by businesses, utilities, service providers, and other organizations, to understand the impact of changes to key variables that change overall outcomes. For example, in an electrical utility, understanding the data dependency model of electricity load forecasting would enable the utility to surface data that can affect how the utility can forecast demand and the expected loads on the electrical network. In another example, understanding the data dependency models of e-commerce would enable an organization to surface more meaningful and actionable analytics products to them.

As detailed further below, the data dependency model may be composed of factors (e.g., metrics, drivers, outcomes, etc.) represented as nodes in a directed graph. Factors may be inputs that influence or contribute to a metric (or other factor) that is being represented in a UI feature. Using a tree-like structure by way of example, as one moves toward the leaf nodes, more factors may be seen that describe how a factor may be influenced. The associated data or metric in a node can itself be a factor since some data/metrics may influence other data/metrics in the data dependency model. Factors may either have a direct or indirect contribution and may be distinguished from each other in that way. For example, a numerical factor that is directly measurable may be considered a direct factor, while other factors that do not have a measurable (or easily measurable) relationship with other factors may still contribute and thus be considered indirect factors.

In one aspect, there is provided a computer-implemented method comprising: detecting incorporation in a user interface of a user interface feature having associated data; determining, from a data dependency model comprising a representation of a directed graph having nodes representing factors, the factors including at least one indirect factor, and edges representing factors providing inputs to other factors, at least one factor providing an input that affects values of the associated data; and presenting one or more of the at least one factor.

In certain example embodiments, the method may include displaying the user interface having the user interface feature and the one or more of the at least one factor, in an application.

In certain example embodiments, the data structure may be stored by an enterprise system and made available to a plurality of endpoints in the enterprise system.

In certain example embodiments, the associated data of the user interface feature may correspond to a factor providing an input to other associated data in the data dependency model.

In certain example embodiments, the one or more of the at least one factor may be presented in the user interface using a corresponding additional user interface feature.

In certain example embodiments, the one or more of the at least one factor may be presented as an option to incorporate into the user interface using a corresponding additional user interface feature.

In certain example embodiments, the data dependency model may include at least one direct factor determined by a mathematical relationship.

In certain example embodiments, the at least one indirect factor may be determined from a model trained on inputs that influence the indirect factor.

In certain example embodiments, the at least one factor may include a weight corresponding to a relative influence on how values of the associated data are affected by the data associated with the corresponding factor.

In certain example embodiments, weights may be used to determine a priority of the one or more of the at least one factor presented via the user interface.

In certain example embodiments, the method may include determining a factor affecting the user interface feature having incomplete or missing associated data; and presenting the factor having incomplete or missing associated data via the user interface.

In certain example embodiments, presenting the factor having incomplete or missing associated data may include highlighting the factor in the user interface.

In certain example embodiments, the method may include detecting selection of a factor of the at least one factor presented via the user interface; determining, from the data dependency model, at least one additional factor providing an input that affects values of the associated data of the selected factor; and presenting one or more of the at least one additional factor via the user interface.

In certain example embodiments, a priority of the one or more of the at least one factor presented via the user interface may be determined based on a user type.

In certain example embodiments, the user interface may include analytics data related to an organization.

In another aspect, there is provided a system comprising: a processor; a display coupled to the processor; at least one input device coupled to the processor; and at least one memory. The at least one memory includes processor executable instructions that, when executed by the at least one processor, causes the system to: detect incorporation in a user interface of a user interface feature having associated data; determine, from a data dependency model comprising a representation of a directed graph having nodes representing factors, the factors including at least one indirect factor, and edges representing factors providing inputs to other factors, at least one factor providing an input that affects values of the associated data; and present one or more of the at least one factor.

In certain example embodiments, the one or more of the at least one factor is presented as an option to incorporate into the user interface using a corresponding additional user interface feature.

In certain example embodiments, the system may include processor executable instructions that, when executed by the at least one processor, causes the system to: determine a factor affecting the user interface feature having incomplete or missing associated data; and present the factor having incomplete or missing associated data via the user interface.

In certain example embodiments, the system may further include processor executable instructions that, when executed by the at least one processor, causes the system to: detect selection of a factor of the at least one factor presented via the user interface; determine, from the data dependency model, at least one additional factor providing an input that affects values of the associated data of the selected factor; and present one or more of the at least one additional factor via the user interface.

In another aspect, there is provided a computer-readable medium comprising processor executable instructions that, when executed by a processor, cause the processor to: detect incorporation in a user interface of a user interface feature having associated data; determine, from a data dependency model comprising a representation of a directed graph having nodes representing factors, the factors including at least one indirect factor, and edges representing factors providing inputs to other factors, at least one factor providing an input that affects values of the associated data; and present one or more of the at least one factor.

Turning now to the figures, FIG. 1 illustrates an example of a computing environment 10 in which a UI development environment 12 is provided by or with one or more computing devices 50 (see also FIG. 3 described below). Such computing devices 50 can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc.

The UI development environment 12 includes a UI builder workspace 20 to enable a user 18 to interact with the UI development environment 12 and the computing environment 10 more generally, e.g., to build or edit an application 30 having a UI 32 (see also FIG. 2 described below). The UI development environment 12 can take the form of a desktop-type application, a mobile-type application (also referred to as an "app"), an embedded application in customized computing systems, or an instance or page contained and provided within a web/Internet browser, to name a few. The UI builder workspace 20, while shown as part of the UI development environment 12, may instead be provided by a separate computing device 50 from the computing device 50 used to run the UI development environment 12. As such, the configuration shown in FIG. 1 is illustrative and other computing device configurations are possible.

For example, the computing environment 10 shown in FIG. 1 can represent a single device such as a portable electronic device or the integration/cooperation of multiple electronic devices such as a client device and server device or a client device and a remote or offsite storage or processing entity or service. That is, the computing environment 10 can be implemented using any one or more electronic devices including standalone devices and those connected to offsite storage and processing operations (e.g., via cloud-based computing storage and processing facilities).

The UI development environment 12 and UI builder workspace 20 are coupled to a display 14 to render and present/display UI elements, UI components, and UI features 22 utilized by a UI 32 and application 30, on the display 14. While examples referred to herein may refer to a single display 14 for ease of illustration, the principles discussed herein can also be applied to multiple displays 14, e.g., to view portions of the UI 32 (and/or other UIs provided by the application 30) on separate side-by-side screens. That is, any reference to a display 14 can include any one or more displays 14 or screens providing similar visual functions. The UI development environment 12 receives one or more inputs from one or more input devices 16, which can include or incorporate inputs made via the display 14 as illustrated in FIG. 1 as well as any other available input to the computing environment 10, such as haptic or touch gestures, voice commands, eye tracking, biometrics, keyboard or button presses, etc. Such inputs may be applied by a user 18 interacting with the computing environment 10, e.g., by operating a computing device 50 having the display 14 and at least an interface to one or more input devices 16.

Figure 4:
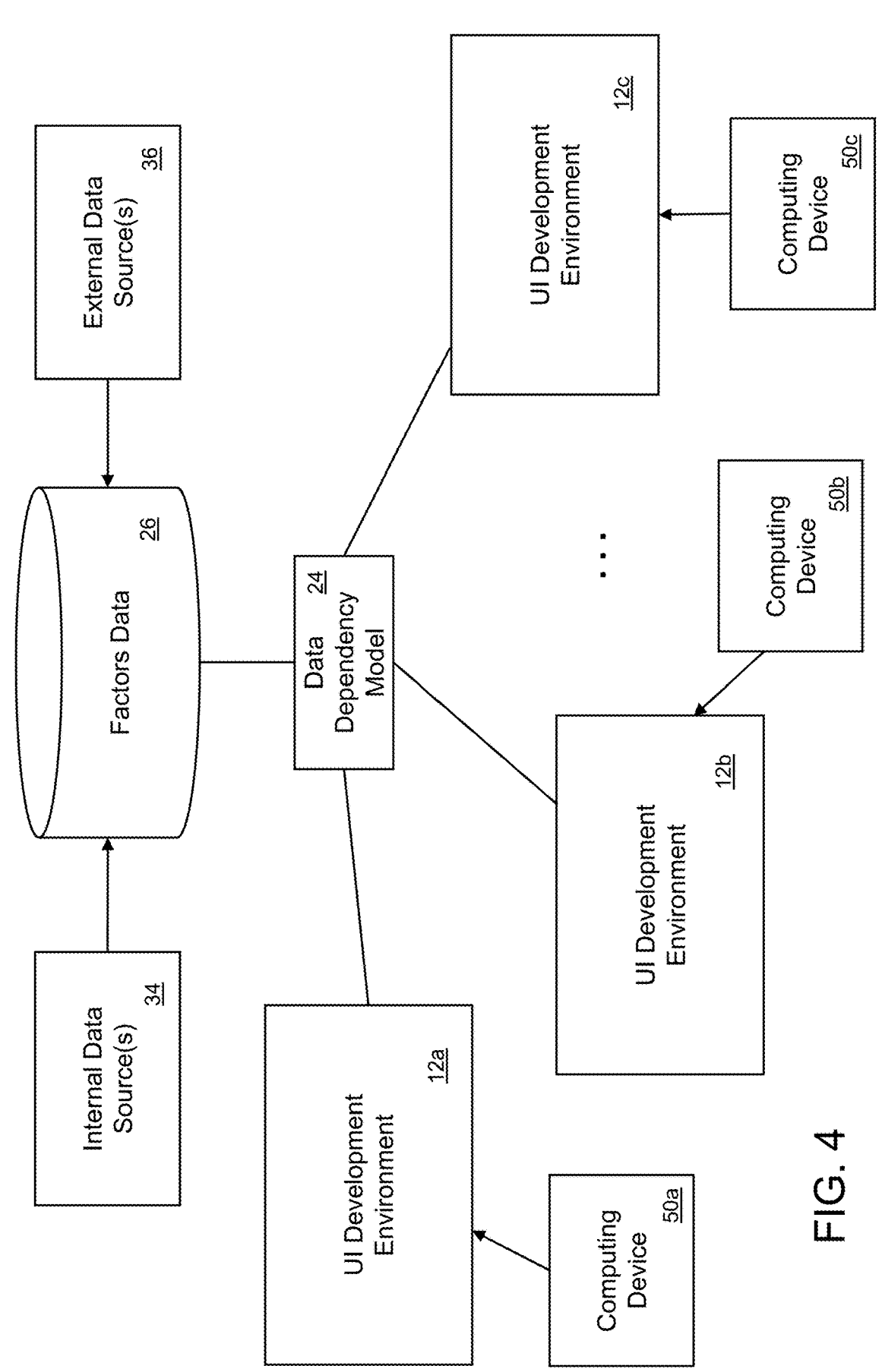
FIG. 4 is a schematic diagram of multiple UI development environments accessing and utilizing a common data dependency model and associated factors data.

The UI builder workspace 20 in this example may be used by a developer (e.g., user 18) to create a UI 32 or software feature for an application 30 that includes a UI feature 22. To identify factors that affect the UI feature(s) 22 being added, edited, or otherwise interacted with, the relationships between factors (and underlying data) may be mapped to each other in a computer-readable data structure herein referred to as a data dependency model 24. The factors and their interrelationships may be provided using the data dependency model 24, which provides a representation that maps how different factors fit together. The data dependency model 24 may be used by businesses, utilities, and other organizations, to understand the impact of changes to key variables that change overall outcomes by enabling UI features 22 to access and utilize the data dependency model 24 and make the associated factors available to the developer and/or end user of the UI 32. The data dependency model 24 is shown within the UI development environment 12 in FIG. 1 for illustrative purposes and such data dependency model 24 may, additionally or alternatively, be stored and made accessible remotely. For example, a centrally stored data dependency model 24 may be made accessible to multiple UI development environments 12 as illustrated in FIG. 4 discussed further below.

The data dependency model 24 maps factors and their underlying data to each other and may be visually represented as a directed graph and stored using any one (or more) of various types of data structures. The data associated with each factor that may be included in the data dependency model 24 may be referred to herein as "factors data" denoted by numeral 26. While a single data storage element storing the factors data 26 is shown in FIG. 1, it can be appreciated that the factors data 26 may be stored, accessed and pulled or pushed from multiple separate storage elements, such as databases storing and updating the associated data and their values from internal and/or external sources.

Figure 2:
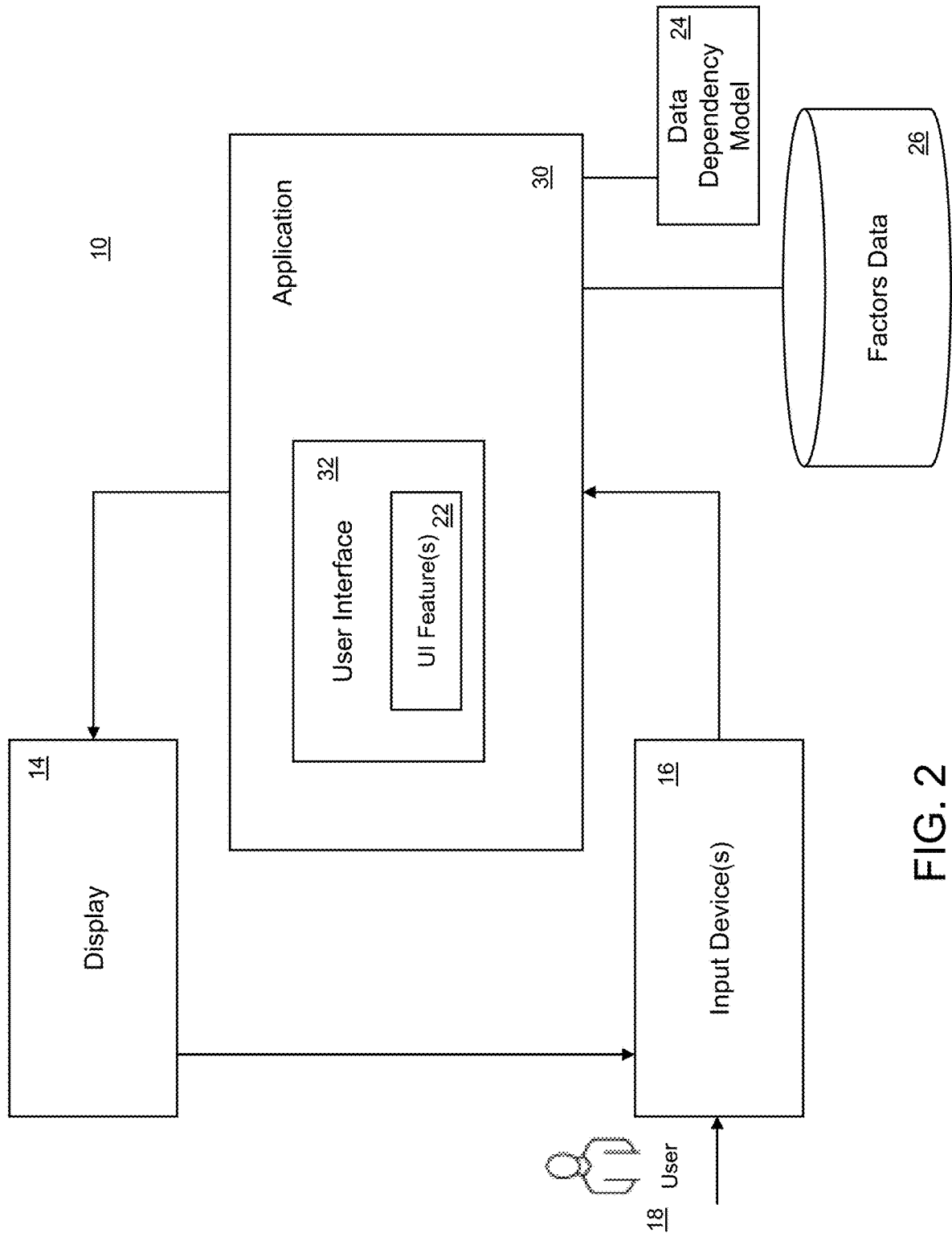
FIG. 2 is an example of a computing environment in which an application having a UI is provided.

Another computing environment 10 is shown in FIG. 2, in which an application 30 is provided by or with one or more computing devices 50, examples of which are listed above. The application 30 includes a UI 32 that may have been developed using the UI development environment 12 described above to include one or more UI features 22, at least one of which utilizes the data dependency model 24 to present at least one related factor in the UI 32. The computing environment 10 shown in FIG. 2 may be configured like that shown in FIG. 1, including a display and input device(s) 16 that may be interacted with by a user 18. The user 18 in the computing environment 10 shown in FIG. 2 may be different from the user 18 shown in FIG. 1, for example an analyst, administrator or other type of user that is not involved in the development of the UI 32. The application 30 may access the data dependency model 24 and the factors data 26 separately as shown, or may access the same from a single source in other configurations. The data dependency model 24 and factors data 26 may thus be provided and utilized in multiple types of computing environments 10, including development as well as in deployment or usage scenarios.

Figure 3:
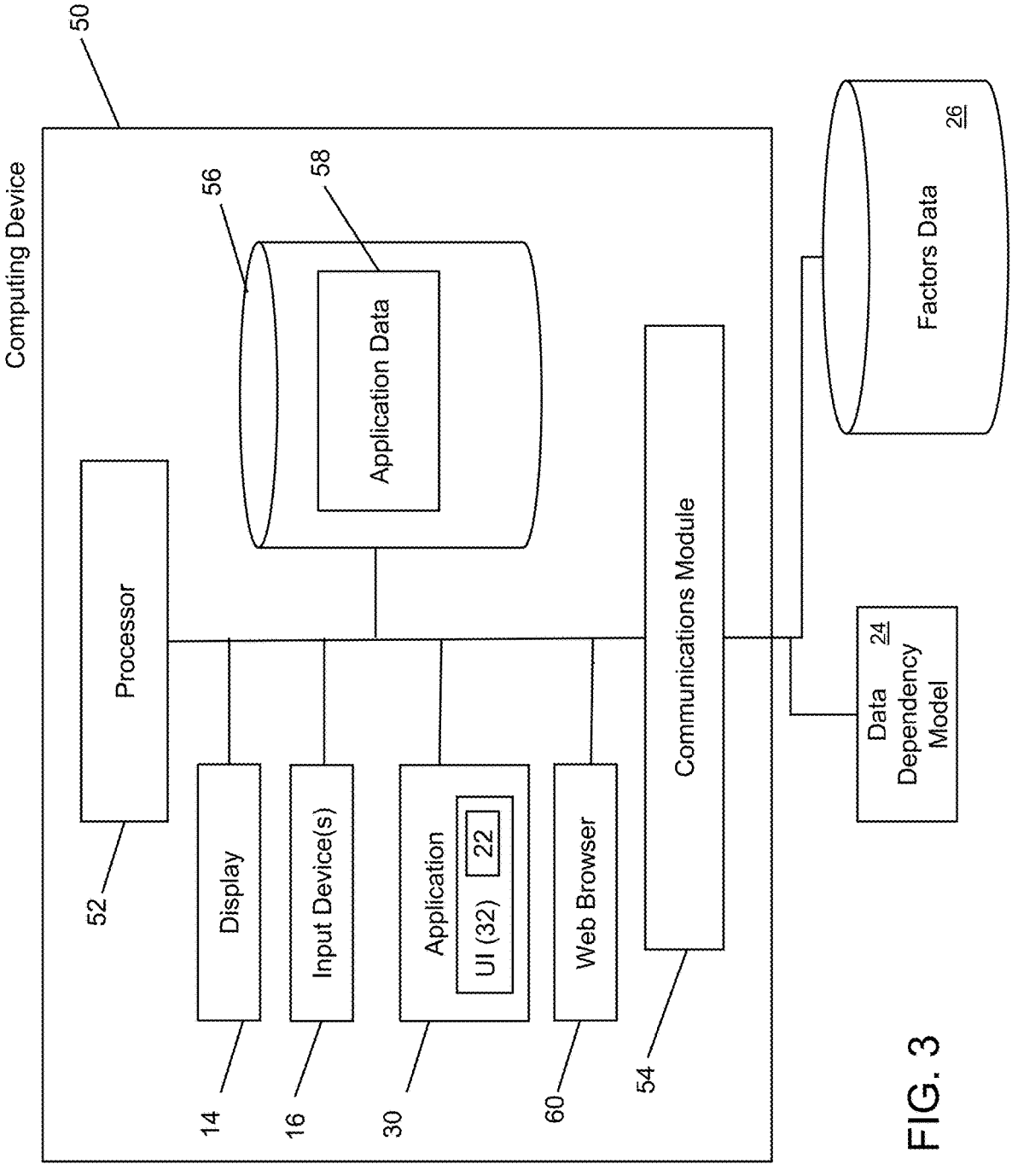
FIG. 3 is an example of a computing device having an application and UI with UI features.

FIG. 3 shows an example of a computing device 50 implementing an example embodiment of the computing environment 10 shown in FIG. 1 and/or FIG. 2. In this example, the computing device 50 includes one or more processors 52 (e.g., a microprocessor, microcontroller, embedded processor, digital signal processor (DSP), central processing unit (CPU), media processor, graphics processing unit (GPU) or other hardware-based processing units) and one or more communications modules 54 (e.g., a wired or wireless transceiver device connectable to a network via a communication connection). Examples of such communication connections can include wired connections such as twisted pair, coaxial, Ethernet, fiber optic, etc. and/or wireless connections such as LAN, WAN, PAN and/or via short-range communications protocols such as Bluetooth, WiFi, NFC, IR, etc. The computing device 50 also includes a data store 56, the application 30, and/or a web browser 60. The data store 56 may represent a database or library or other computer-readable medium configured to store data and permit retrieval of such data. The data store 56 may be read-only or may permit modifications to the data. The data store 56 may also store both read-only and write accessible data in the same memory allocation.

While not delineated in FIG. 3, the computing device 50 includes at least one memory or memory device that can include a tangible and non-transitory computer-readable medium having stored therein computer programs, sets of instructions, code, or data to be executed by processor(s) 52. The processor(s) 52 and communication module(s) 54 are connected to each other via a data bus or other communication backbone to enable components of the computing device 50 to operate together as described herein. FIG. 3 illustrates examples of modules and applications stored in memory on the computing device 50 and operated by the processor(s) 52. It can be appreciated that any of the modules and applications shown in FIG. 3 may be hosted externally and be available to the computing device 50, e.g., via a communications module 54. The data store 56 in this example stores, among other things, application data 58 that can be accessed and utilized by the application 30. The application data 58 may include or provide a cache for the data dependency model 24 and/or factors data 26 to enable the UI 32 and UI feature(s) 22 that utilize the data dependency model 24 to access current associated data (e.g., from the factors data 26).

The computing device 50 also includes the display 14 and one or more input device(s) 16 that can be utilized as described above. The application 30 includes a UI 32 and one or more UI features 22, which can also be utilized as described above in connection with FIGS. 1 and 2. The web browser 60 is shown by way of example to illustrate that the application 30, or an application that is similarly configured, may be accessed by a user of the computing device 50 via a network (not shown) accessible via the communications module 54. That is, an application 30 and UI 32 may also be accessed and utilized by the computing device 50 from a server or other remote source and need not be a locally running application 30.

Referring now to FIG. 4, multiple UI development environments 12 may be connectable to a centrally stored and maintained data dependency model 24. In this way, the data dependency model 24 may be made accessible to multiple endpoints in an organization at the same time, to provide a consistent mapping of factors across all UIs 32 that are developed in that organization. In the example shown in FIG. 4, three UI development environments 12a, 12b, 12c are shown, but more or fewer may exist. Each development environment 12a, 12b, 12c in this example is interacted with using respective computing devices 50a, 50b, 50c. The separation between the UI development environment 12 and computing device 50 in this example is illustrated and the UI development environment 12, additionally or alternatively, may itself be embodied within the same computing device 50. The centralized configuration shown in FIG. 4 permits a single data dependency model 24 to be shared consistently with each of the UI development environments 12a, 12b, 12c such that any updates or changes to the data dependency model 24 can propagate throughout an organization or any number of entities accessing the centralized data dependency model 24 without the need to make changes in multiple locations. This allows consistency to be enforced accordingly. The factors data 26 can similarly be centralized if stored in a single location as shown, however, multiple factors data 26 sources may exist as discussed above. The factors data 26 may include and be periodically or continually updated using internal data sources 34 such as operational data within an organization that is continually being updated and changed, as well as external data sources 36 that are referenced or otherwise utilized by a particular factor. For example, traffic, weather, or other environmental data may be sourced from such an external source 36 and stored as factors data 26 that provides underlying associated data for factors represented in the data dependency model 24.

Figure 5:
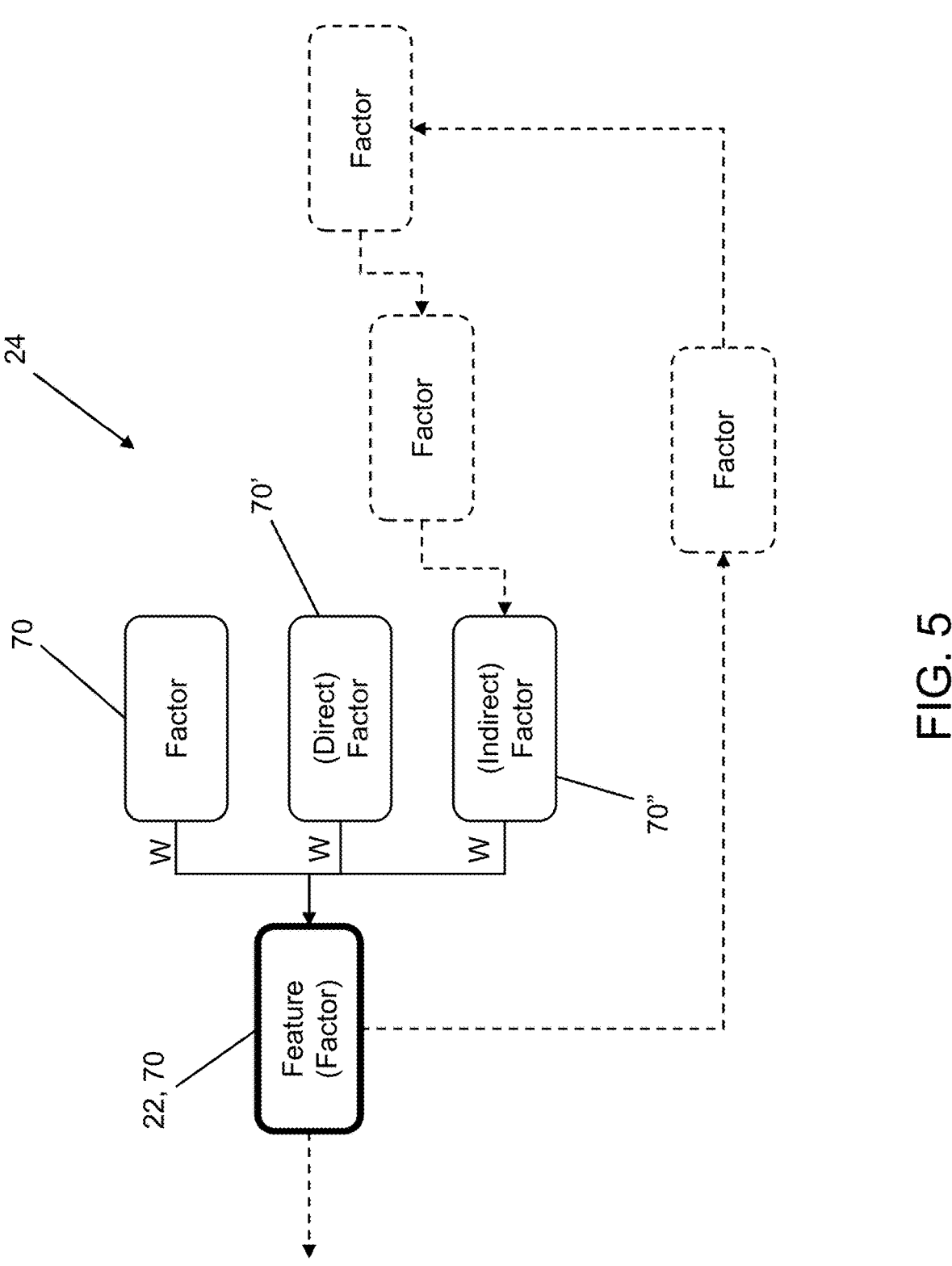
FIG. 5 shows an example of a data dependency model structured as a directed graph.

A visual representation of the data dependency model 24 is shown in FIG. 5. The data dependency model 24 is visualized in FIG. 5 as a directed graph with each node representing a factor 70 and each edge representing the relationship between nodes or factors 70. In this example, a UI feature 22 is highlighted at the leftmost node in the graph and may itself be a factor 70 that becomes an input to one or more other factors 70 further down a tree-like graph or may be an input to a factor 70 that itself indirectly serves as an input to the feature 22. As such, while factors 70 may be related to each other in a tree-like structure, the data dependency model 24 may more generally be visualized as a directed graph that permits feedback and other types of loops.

The UI feature 22 in this example has a first level of input factors 70, 70', 70'' and each edge connecting the input factor

70, 70', 70'' to the feature 22 may have a weight (W). The weight W may be used to attach a relative importance to a factor 70, which can be utilized by the UI feature 22 to determine a priority of factors 70 to surface in a UI 32. The UI feature 22 may also have one or more additional input levels, shown in dashed lines in FIG. 5, as well as a possible feedback loop to an upstream factor 70.

Factors 70 may be distinguished from each other by having a direct or indirect contribution. In FIG. 5, a direct factor 70' and an indirect factor 70'' are shown, however, may collectively be referred to as factors 70. For example, a factor 70 representing revenue may be directly/mathematically represented as an Average Order Value (AOV), and the number of orders, i.e., a direct factor 70'. One can express this relationship in a mathematical way:

$$\text{Revenue} = \text{AOV} \times \text{\# of orders}$$

In the above example, AOV and the number of orders contribute directly to revenue. AOV may in turn be represented as the average number of items in a shopping cart and the average price of each item. This relationship may also be represented as a mathematical formula and thus provide a direct factor 70'. There are additional factors 70 that may contribute to the average number of items in a shopping cart. For example, cross-selling and volume discounts may contribute indirectly to the average number of items in a shopping cart (i.e., may be considered indirect factors 70''). In this case, there is no direct mathematical relationship between these factors 70 and the average number of items in the shopping cart, but a model may exist or may be trained/generated to show that this is a historically observed way of getting customers to buy more at once, i.e., an indirect factor 70''. Indirect factors 70'' may be determined from a model that is generated or trained by a machine learning tool or machine learning system (not shown). Such a machine learning tool may be used to train machine learning models associated with indirect factors 70'', and inputs to and outputs from such indirect factors 70'', to allow a data dependency model 24 to provide insight into indirect factors 70'' affecting values associated with the associated data in a UI feature 22. The machine learning tool may create or train existing models or new models based on data gathered, used, analyzed, and otherwise flowing within a system or organization and that may be fed into the machine learning tool to train one or more machine learning models that permit the UI feature 22 to determine characteristics of an indirect factor 70''. A machine learning tool may be used to train machine learning models by generating classifiers that can be used to predict an appropriate value for the weight associated with an indirect factor 70'' based on the inputs and other values affecting that indirect factor 70''. For example, a trained model associated with the indirect factor 70'' may be input to the machine learning tool to run that data against a set of classifiers that have been generated and may be used to understand how the input variables relate to the associated classes. The classifiers may be trained using the machine learning tool (or another machine learning system) by labeling a dataset of factors data 26 (and/or with other related data) to enable the input data to be used to find the most appropriate value for the indirect factor 70''. Specific datasets can be used to train models that identify desirable characteristics based on a class, the class being associated with a factor 70 used to classify an input to the machine learning model to in turn identify the appropriate value that represents that indirect factor 70''.

Figure 6:
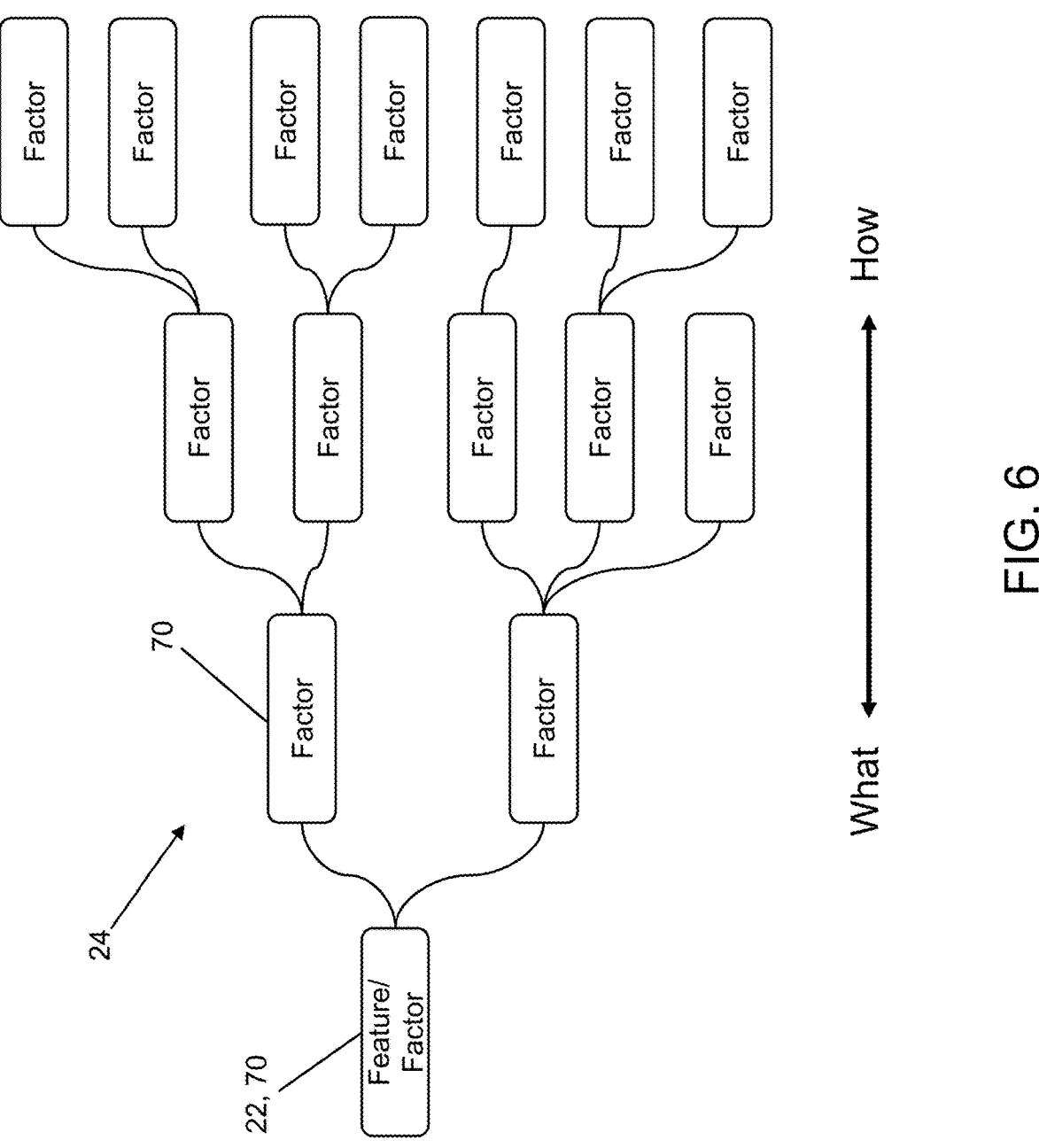
FIG. 6 shows an example of a data dependency model structured as a tree-like directed graph.

An example of a tree-like data dependency model 24 is visualized in FIG. 6. In the tree-like structure shown in FIG.

6, as one traverses the tree from the UI feature 22 towards the leaf nodes, the "how" that contributes to the "what" can be determined. It can be appreciated that the particular tree-like structure shown in FIG. 6 is only illustrative of a particular example of the data dependency model 24 shown in FIG. 5.

Each of the factors 70 in a domain-specific data dependency model 24 may be mapped to underlying data values stored in a software platform that operates in the model's domain (e.g., mapping data values within an organization providing a software platform that operates in the e-commerce space to an e-commerce-specific data dependency model 24).

Some factors 70 in the data dependency model 24 may not have corresponding stored data values. For example, if the e-commerce software platform referred to above has not yet implemented a feature such as a loyalty program, then the factors 70 in the branch of the data structure associated with loyalty factors 70 may not be mapped to any underlying data values.

The relative importance of considering factors 70 that impact a metric may be determined and used in prioritizing which factors 70 are displayed or otherwise available to a UI user or UI designer using the weighted edges shown in FIG. 5, e.g., by assigning weights W. Such weights W may be stored as values in a correlation matrix or other data structure as provided by way of example below.

For example, a first level of factors 70 from the data dependency model 24 may be surfaced by default with an ability to surface factors 70 that impact those surfaced factors 70 to continue to drill into the data dependency model 24 either during development or during use of the UI 32. As another example, when there are only a few available portions or slots in a UI 32 for a set of factors 70 to be displayed, then the few factors 70 to surface (chosen from a much larger full set of factors 70) may be determined by selecting those factors 70 with the largest impact on the overall factor associated with the UI feature 22. For example, if the UI 32 is being used for a main metric of customer life-time value (CLTV) and there are only five slots available for extra (related) factors 70 then the top five underlying factors 70 driving CLTV by strongest correlation may be selected. Such a "top five" list of underlying factors 70 may be determined based on which factors 70 have the highest combined weight W. Each missing or incomplete factor 70 may also be determined. For example, factors 70 that do not map to underlying data may potentially be ignored or flagged to the user 18 (e.g., developer). The relative importance of the factors may also be adjusted on a per-user (e.g., per-merchant) basis when considering the user-facing UI 32. This may be done by setting and adjusting weights W applied to the edges of the directed graph used to represent the data dependency model 24. That is, the UI 32 that is being designed and later used can adapt to different user types, organization types, or other characteristics.

An example of a domain-specific data dependency model 24 for an electrical utility is shown. In this example, the factors illustrated may represent an entire data dependency model 24 or a portion thereof. The factor 70 that is highlighted as a UI feature 22 corresponds to an electricity load forecast. The electricity load forecast may be based on certain inputs, which may be allocated as factors 70 in the data dependency model 24. Here, the inputs may include a forecast horizon (i.e., how long into the future is the forecast), a location (e.g., a neighborhood, city, region, or other portion of an electricity network), ambient conditions, and historical patterns that have been tracked and modeled over time. These top-level factors 70 may themselves have inputs that can be allocated as factors 70. For example, the location factor 70 may be influenced by the calendar (time of year) and seasonal metrics (e.g., impacts of time of year) and location events such as large users of electricity at that location or during certain times of year. In another example shown in FIG. 7a, the ambient conditions factor 70 may be influenced by various ambient values, such as weather, air temperature, wind speed, etc. By allocating values and metrics to factors in the data dependency model 24, a user 18 may drill into and surface the dependent factors 70 when determining the relevance of the associated data and how information is to be displayed in a UI 32 being developed. For example, a UI feature 22 that shows an electricity load forecast may benefit from having the first level factors 70 displayed or be easily accessible from the same UI 32. In this way, a user 18 observing a current load forecast could determine whether historical patterns are affecting this forecast and should be taken into account when making decisions based on the electricity load forecast such as increasing generation capacity during certain months or weeks during the year.

Figure 7A:
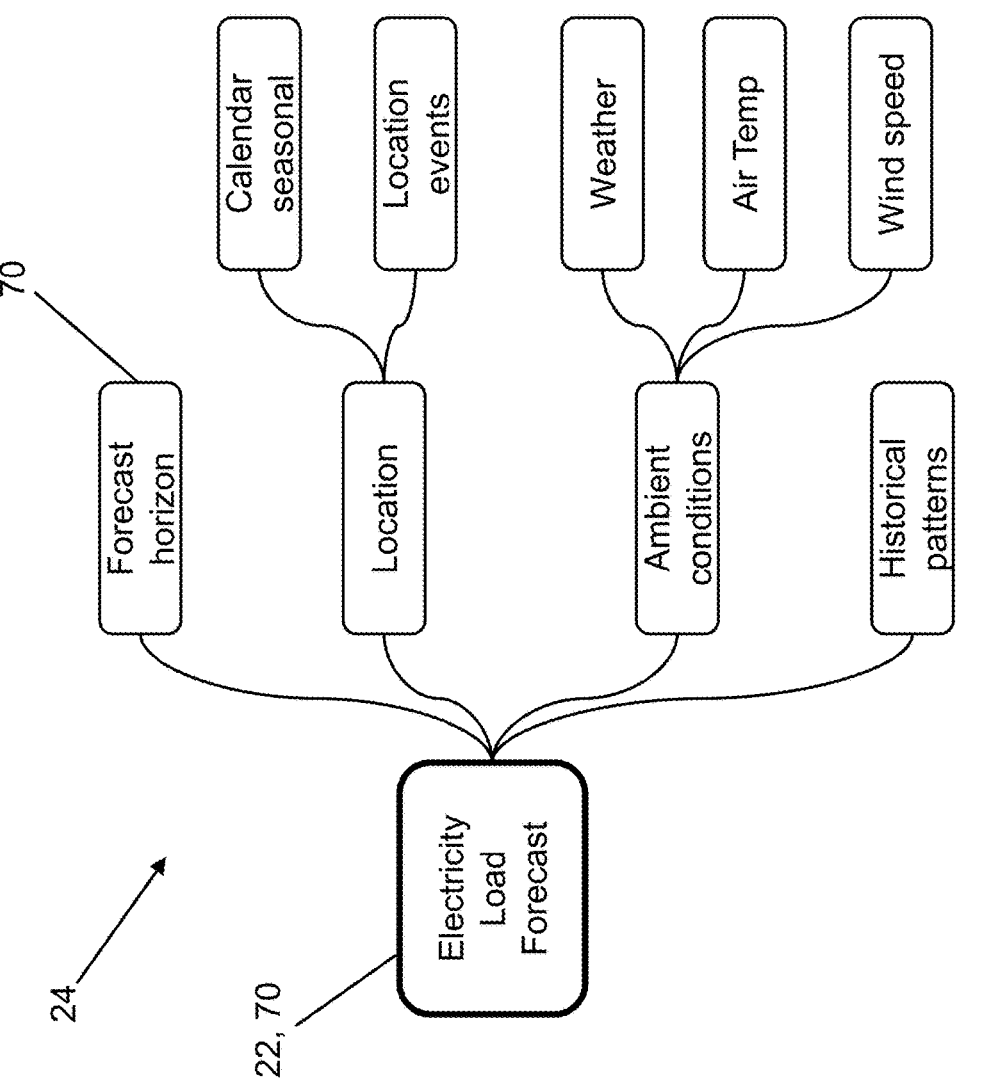
FIG. 7a shows an example of an electricity load forecasting data dependency model.
Figure 7B:
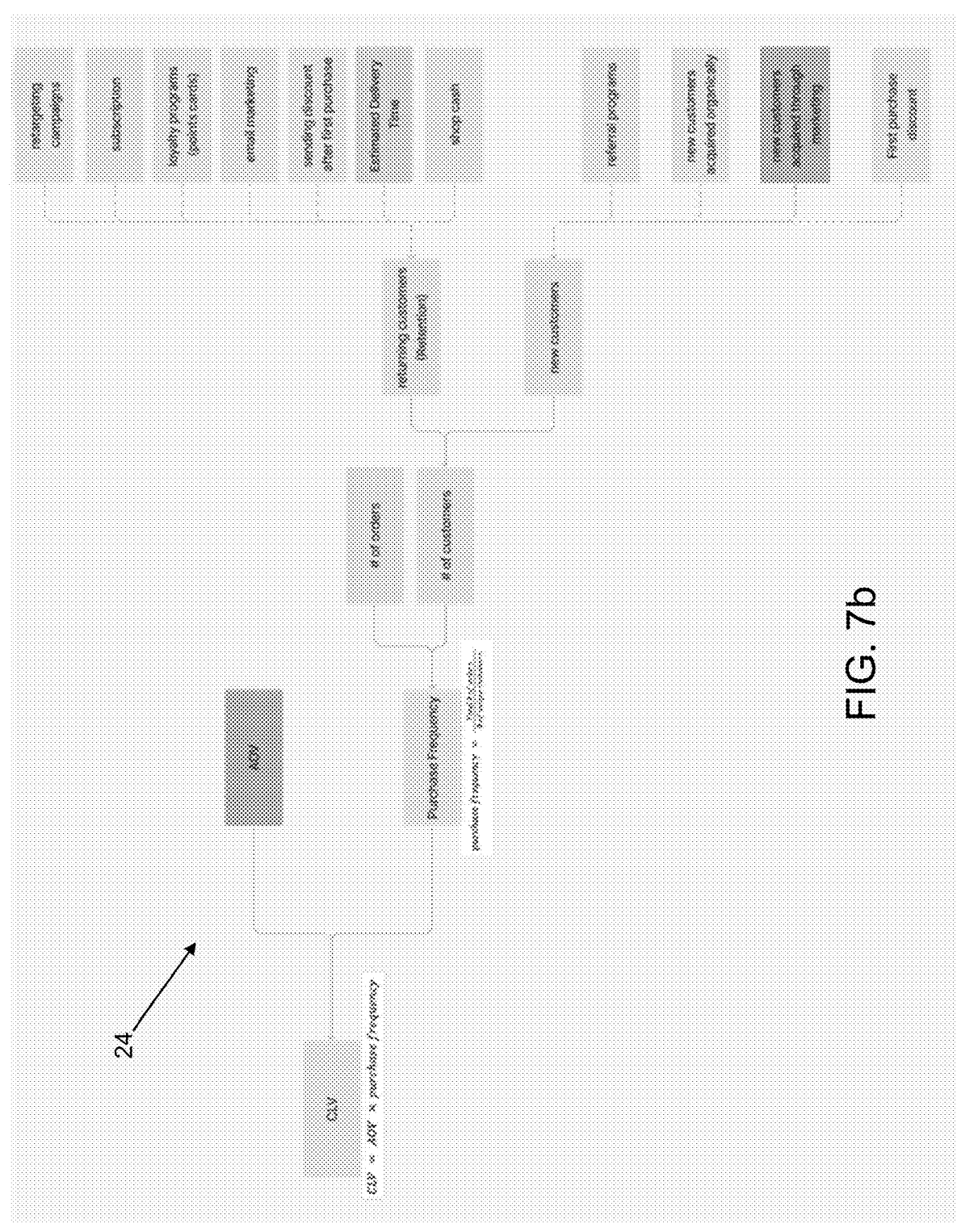
FIG. 7b shows an example of an e-commerce data dependency model.

FIG. 7b illustrates a domain-specific data dependency model 24 for an e-commerce UI 32. In this example, should a customer lifetime value (CLV) metric be selected as a UI feature 22, the data dependency model 24 shown in FIG. 7b may be referenced to determine factors 70 that influence this metric. For example, CLV in this example may be considered a direct factor 70' that is based on the following mathematical relationship:

$$CLV = AOV \times \text{purchase frequency}.$$

When displaying CLV in a UI feature 22, a developer may then wish to also display or provide convenient access to the AOV and purchase frequency factors 70 based on this data dependency model 24. The data dependency model 24 may also be used to allow a user 18, such as a developer, to drill down further, e.g., by determining that purchase frequency can be represented by the following mathematical relationship:

$$\text{purchase frequency} = \text{total number of orders/number of unique customers}.$$

In this example, drilling down into the number of unique customers, the data dependency model 24 informs the user 18 that this value is determined based on a combination of returning customers and new customers, which may be direct factors 70' used to tabulate the number of unique customers. Drilling down further, as illustrated in FIG. 7b, various indirect factors 70" are illustrated that do not have mathematical relationships but can be measured and modeled in order to determine what inputs influence what constitutes, for example, a returning customer. As detailed above, values associated with such indirect factors 70" may be determinable from an associated model, which has been trained using a machine learning tool based on data that affects such an indirect factor 70", e.g., other factors 70.

It can be appreciated that the examples shown in FIGS. 7a and 7b are illustrative and other domain-specific data dependency models 24 may be generated and utilized as described herein, for example, in healthcare, cloud computing, and other operational environments in which certain metrics are influenced by factors 70 that may provide inputs in determining values associated with the metric.

Figure 8:
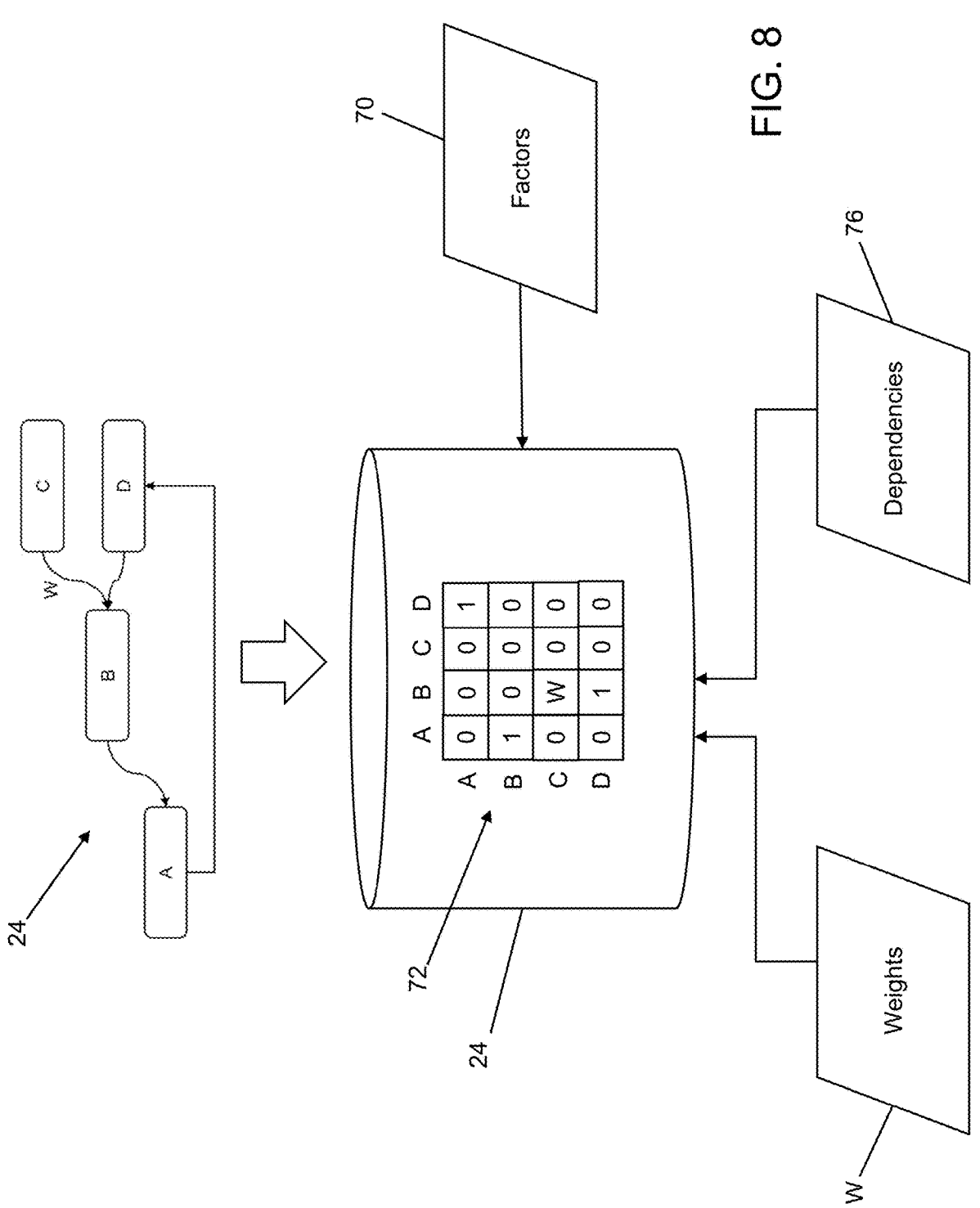
FIG. 8 shows a data dependency model stored using a matrix of values with data inputs enabling changes to the data dependency model.

Referring now to FIG. 8, one example of a storage mechanism for a data dependency model 24 is shown. In this example, a simplified directed graph is shown to represent the data dependency model 24 for a set of four factors shown as nodes: A, B, C, and D. The edges in the data dependency model 24 show the connections between these nodes. In one case, the influence of factor C on factor B includes a weight W. To capture the node connections, directionality, and weight W, a matrix 72 is shown stored in a datastore. The matrix 72 may be populated based on a set of factors 70, a set of weights W, and a set of dependencies 76 (providing directionality). A numeral "1" in the matrix denotes a connection and the directionality is determined based on a [row, column] notation. A weight W may be added by replacing the "1" with the value for the weight W. By storing the data dependency model 24 separately from the UI feature 22 that references it, any changes to the weights W, dependencies 76, and factors 70 may occur without the need to separately update each UI feature 22 that references the data dependency model 24. By providing a centrally accessible data dependency model 24 as shown in FIG. 4, consistency can be provided across multiple UIs 30 developed in different areas of an organization. In some embodiments, the matrix 72 may be all Boolean values (0, 1) or (true, false). In some embodiments, the matrix 72 may be all weights (e.g., real values in a given range such as between −1 and 1) and, further, may use values outside the given range to denote null, undefined, or otherwise unknown relationships.

As indicated above, other data structures may be utilized to store a representation of the directed graph that is used herein to visualize the data dependency model 24. For example, FIG. 9 illustrates a tabular representation of a data dependency model 24. In this example, the table includes a row for each input to a node such that a node may occupy multiple rows in the table. Each "driver" or factor 70 affecting a node thus occupies one of these rows for that node, and direct versus indirect relationships as well as associated formulae are captured in separate columns. In this way, a UI feature 22 for net profit may determine that operating profit, taxes, interest, revenue and cost of goods sold (cogs) are factors 70 that influence net profit.

Other data structures that may be used to store a representation of the data dependency model 24 as a directed graph include, without limitation, linked lists, dynamic arrays, etc. In general, a directed graph is a data structure that stores data in vertices or nodes and these nodes or vertices are connected and also directed by edges (one vertex is directed towards another vertex through an edge) that may have some weight W. A directed graph (or "digraph") may also be referred to as a directed network. In a matrix representation, an adjacency matrix may be used to store and hold the graph. In a list representation, an adjacency linked list may be implemented to store and hold the graph's data in memory. In an adjacency list, because of the implementation of a linked list, adding vertices is considered convenient. In use, the graph may be traversed using a breadth-first search (BFS) or a depth-first search (DFS).

Figure 10:
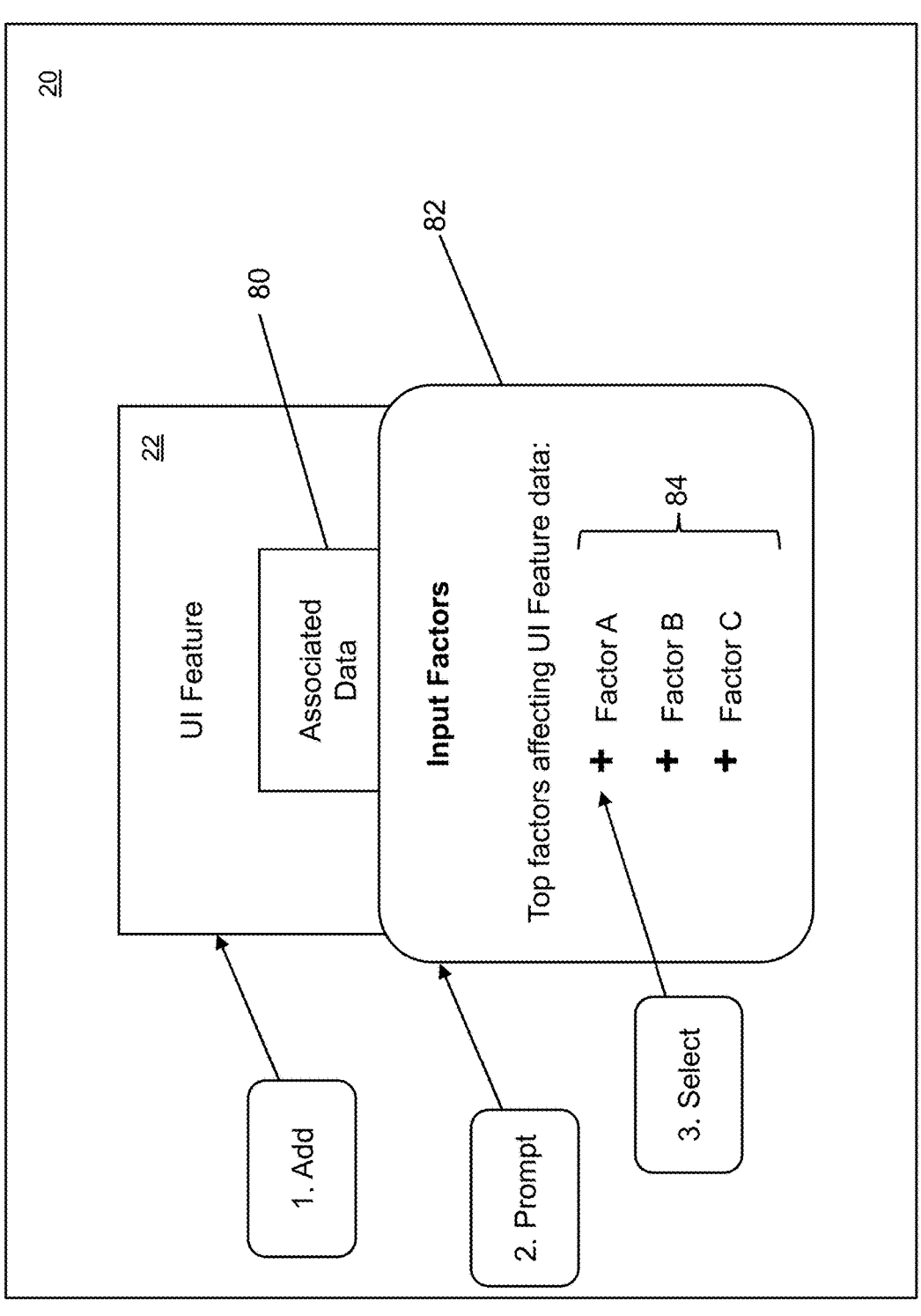
FIG. 10 shows an example of an application UI having a UI feature with associated data affected by inputs determined from a data dependency model and including a prompt to add associated factors.

As discussed above, the data dependency model 24 may be used to provide a developer with insight into factors 70 that provide inputs or otherwise affect values of data associated with a UI feature 22, which itself may be a factor 70. FIG. 10 shows an example of a UI for the UI builder workspace 20, which may be provided by or for the UI development environment 12. The UI builder workspace 20 in this example may be used to create a UI 32 for an application 30. At step 1 in this example, the developer (i.e., user 18) adds a UI feature 22, which includes associated data 80. The associated data 80 may relate to a factor 70 in the data dependency model 24 and provide values for a metric, e.g., a load forecast in megawatts, an AOV in dollars, etc. The associated data 80 may be sourced from the factors data 26 or elsewhere. The factor 70 associated with the UI feature 22 may need to be specified by the developer or may be automatically identified by the UI builder workspace 20. For example, the UI feature 22 may utilize terminology that is mapped to a factor 70 in a domain-specific data dependency model 24 to enable the data dependency model 24 to be used for and with that UI feature 22 being added at step 1.

In step 2, a prompt 82 is displayed to notify the developer of input factors 70 for the associated data 80 in the UI feature 22. Step 2 may be responsive to the addition of the UI feature 22 or may be initiated using some other mechanism such as a menu option, link, button, etc. The prompt 82 may be used to leverage the data dependency model 24 in building a UI 32 that includes the UI feature 22. For example, when the prompt 80 is initiated the UI builder workspace 20 may reference the data dependency model 24 to determine the most important factors 70 (e.g., based on weights W) that influence the associated data 80 in the UI feature 22. In this way, the developer is made aware of these important factors 70 and may then incorporate them into the UI design. This may include adding additional UI features 22 that relate to or otherwise incorporate the important factors 70 or links to such factors 70. In the example shown in FIG. 10, the prompt 82 includes a list 84 of factors 70 with an option to add the factor 70 to the UI builder workspace 20 in creating a UI 32. As indicated above, selecting a factor 70 may add a UI feature 22 or a link to obtain information for the selected factor 70.

Figure 11:
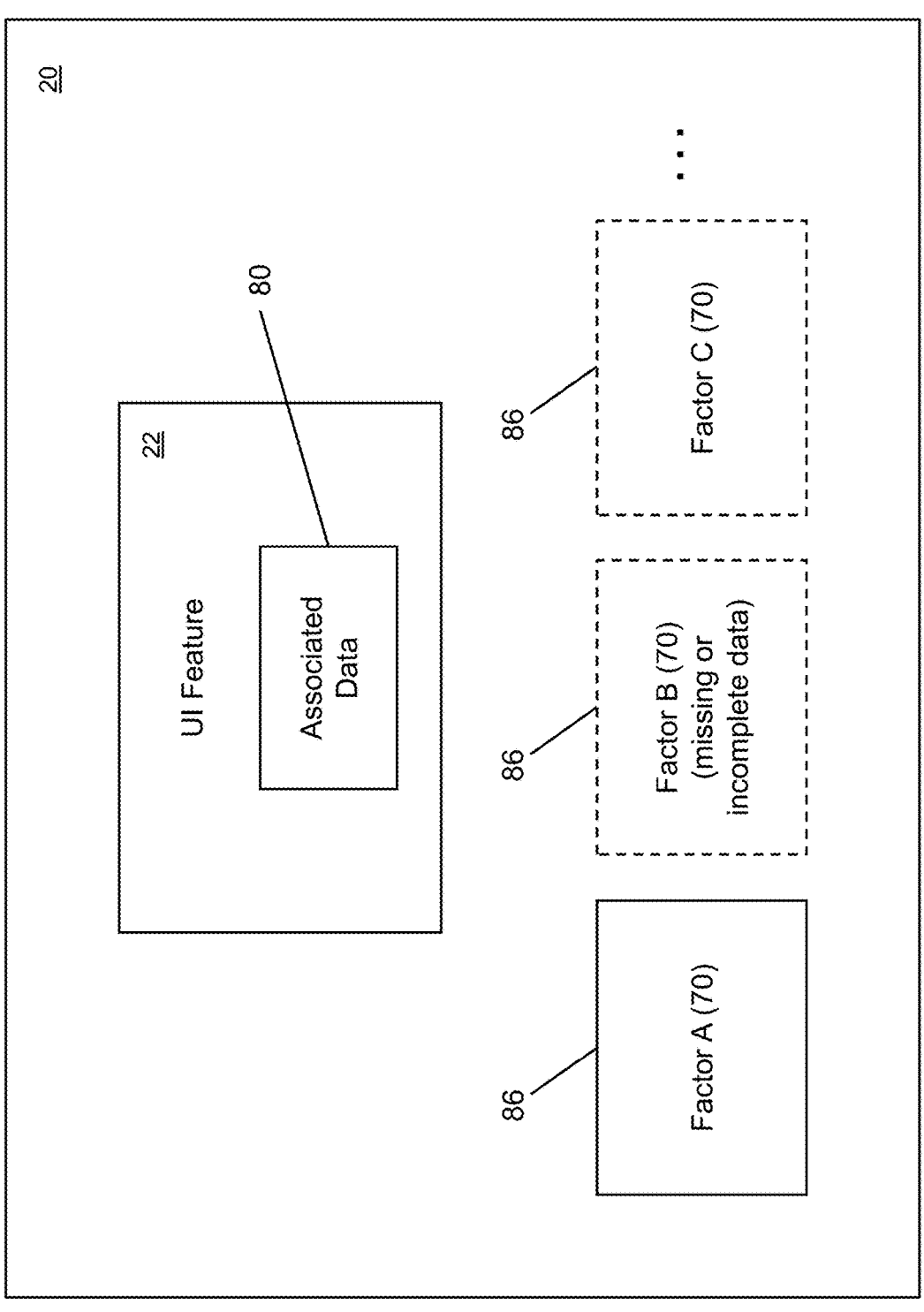
FIG. 11 shows an example of an application UI having a UI feature with at least one associated factor displayed in the UI.

FIG. 11 illustrates an example in which one or more factor elements 86 are added to the UI builder workspace 20. As shown in solid lines, Factor A has been selected in step 3 of FIG. 10 and this adds a factor element 86 that is displayed in association with the UI feature 22 and its associated data 80. Optional additional factor elements 86 are shown in dashed lines. In one example, Factor B is shown with missing or incomplete data. The factor element 86 for Factor B may therefore provide a placeholder or shell for Factor B that flags to the developer (or end user 18 of the UI 32) that Factor B may be a known influencer of the associated data 80 in the UI feature 22 (i.e., based on a relationship determined from the data dependency model 24) but is not complete or is missing from the data set(s) sourced for this particular UI 32. Using the example above, if the UI feature is AOV and an important factor includes loyalty information, but a loyalty program has not been set up for that merchant, Factor B may be flagged and surfaced to show a missing or incomplete factor 70 that could influence changes or improvements to the AOV. FIG. 11 also shows a Factor C in dashed lines to illustrate that any number of factor elements 86 may be added based on the inclusion of the UI feature 22 and making reference to the data dependency model 24. It can be appreciated that while FIG. 11 shows the inclusion of the factor elements 86 directly in the UI builder workspace 20, these factor elements 86 may, alternatively or additionally, be revealable upon detecting an input, such as the selection of a menu option, the selection of a link, the detection of a hovering over a link or other UI element, etc.

Figure 12:
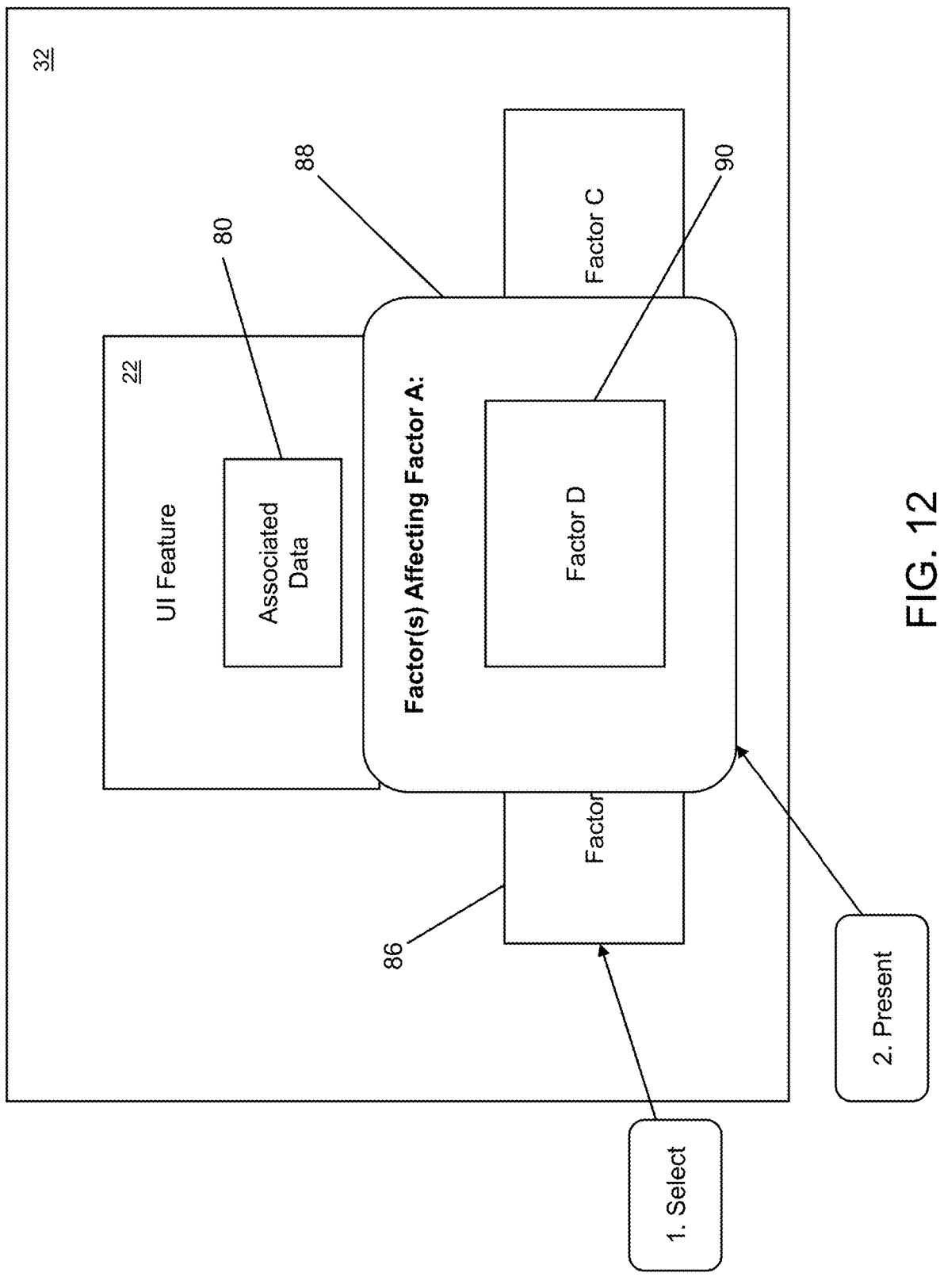
FIG. 12 shows an example of an application UI displaying a drill-down feature for determining factors affecting a selected factor from the UI.

FIG. 12 illustrates an example of a UI 32 for an application 30 that may have been developed using the UI builder workspace 20. In this example, the UI feature 22 with its associated data 80 has been incorporated into the UI 32 and Factors A, B, and C are displayed in the same UI 32. To further leverage the data dependency model 24, the UI 32 may enable a user 18 to select a factor element 86 as is shown in step 1 in FIG. 12. Responsive to selecting a factor element 86, in this example, Factor A, a drill-down element 88 may be presented in the UI 32 at step 2. In this scenario, there is at least one factor 70 that provides an input to or otherwise influences the data associated with Factor A, namely Factor D. The drill-down element 88 may provide a factor preview element 90 to enable the user 18 to view and consider at least some data associated with the factor 70. In this way, the data dependency model 24 may be referenced to determine factors 70 that are inputs to or otherwise influence other factors 70 that are displayed or referenced in a UI 32 to provide a drill-down functionality to reveal and surface data that is at deeper layers of the data dependency model 24, e.g., by traversing a tree towards a leaf node or by following the directionality of the edges in other types of directed graphs.

Figure 13:
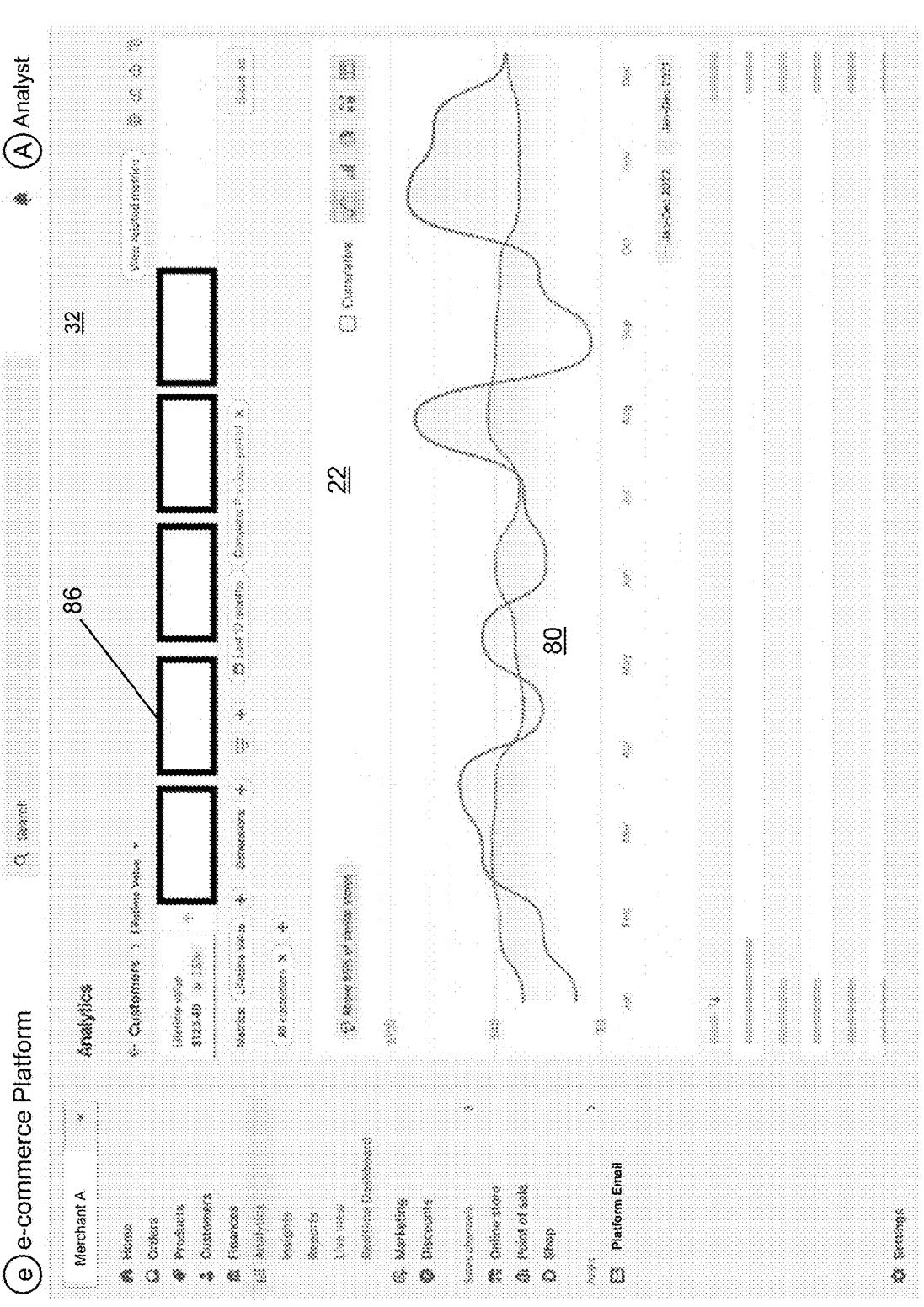
FIG. 13 shows an example of an e-commerce platform UI.

FIG. 13 shows a UI 32 for an e-commerce platform analytics tool in which a UI feature 22 having associated data 80 has been included in the design of the UI 32. The UI feature 22 in this example provides associated data 80 for lifetime value of a customer. In this example, a set of five factor elements 86 have also been included in the UI 32 and are surfaced along the top of the UI feature 22. The factor elements 86 may be selected according to importance, e.g., based on weights W determined from the data dependency model 24 or based on selections made by a developer, e.g., as shown in FIG. 10. Following an example given above, when there are only a few available slots in a UI 32 for a set of factors 70, then the few factors 70 to surface (chosen from a much larger full set of factors 70) may be determined by selecting those factors 70 with the largest impact on the overall factor 70 of the UI 32, in FIG. 13 that being the UI feature 22 related to customer lifetime value (CLTV). For example, if the UI 32 is for a primary metric of CLTV (customer life-time value) and there are only five slots available for extra (related) metrics (see the darkened factor elements 86 in the FIG. 13) then the top five underlying metrics driving CLTV by strongest correlation may be selected.

Figure 14:
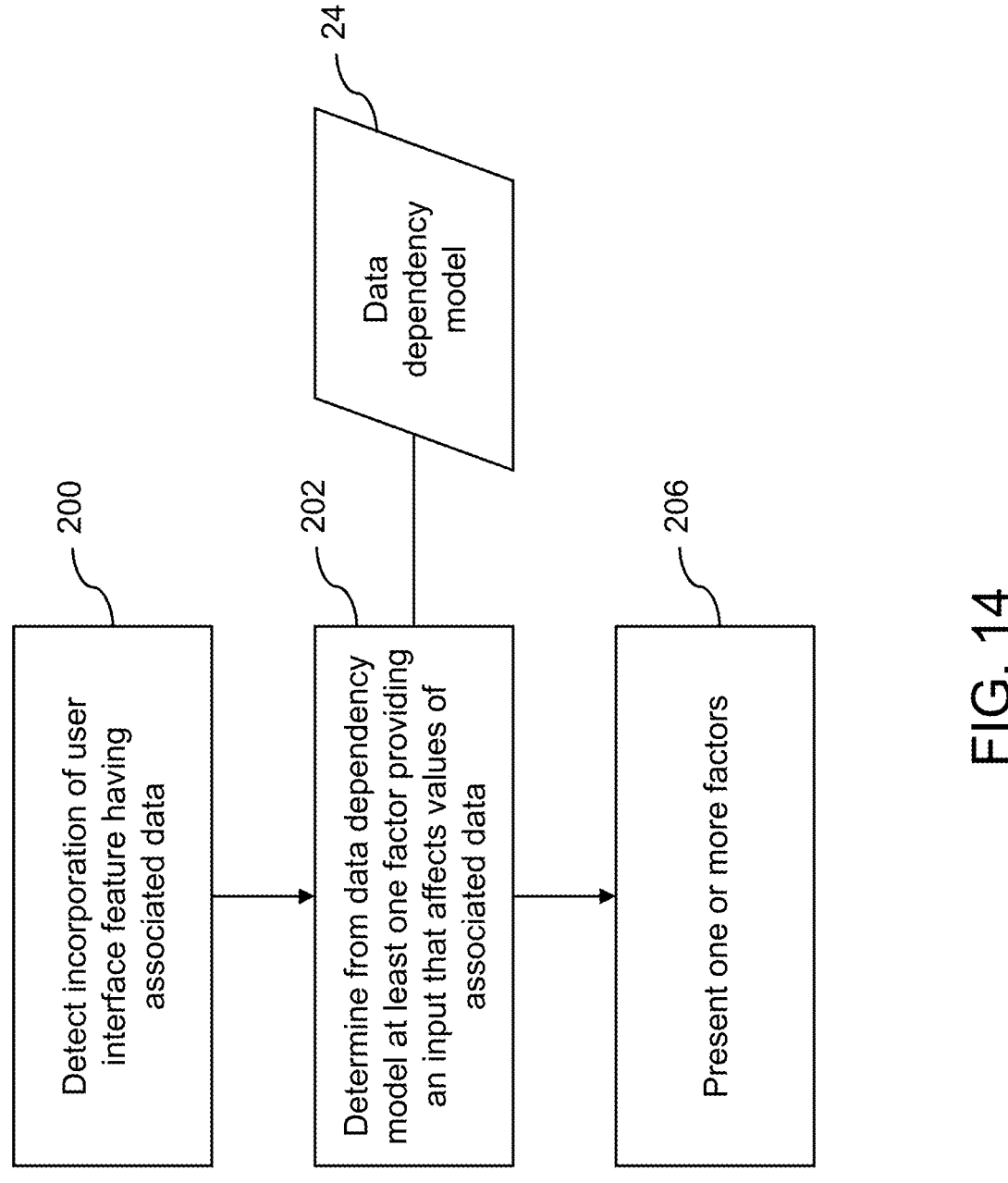
FIG. 14 is a flow chart illustrating example operations for determining factors from a data dependency model and presenting such factors.

FIG. 14 illustrates operations that may be performed in determining factors 70 from a data dependency model 24 and presenting such factors 70 in a UI 32. The operations shown in FIG. 14 may be executed in a development environment such as the UI development environment 12 shown in FIG. 1 or in an interactive UI environment in which incorporation of a UI feature 22 is permitted. For the purpose of this illustrative example, the operations shown in FIG. 14 may be performed by a user 18 interacting with a UI builder workspace 20. At block 200, the UI builder workspace 20 detects the incorporation of a UI feature 22 having associated data 80, e.g., shown as step 1 in FIG. 10. At block 202, the UI builder workspace 20 may determine from a data dependency model 24 at least one factor 70 that provides an input or otherwise influences or affects the values of the associated data 80 in the UI feature 22 being presented. One or more of the factors 70 providing an input that affects the associated data 80 may be presented at block 206, e.g., by prompting the user 18 to add a factor element 86, or to flag or surface information related to the factor(s) 70, whether or not a new factor element 86 is added for presentation within the UI 32.

Figure 15:
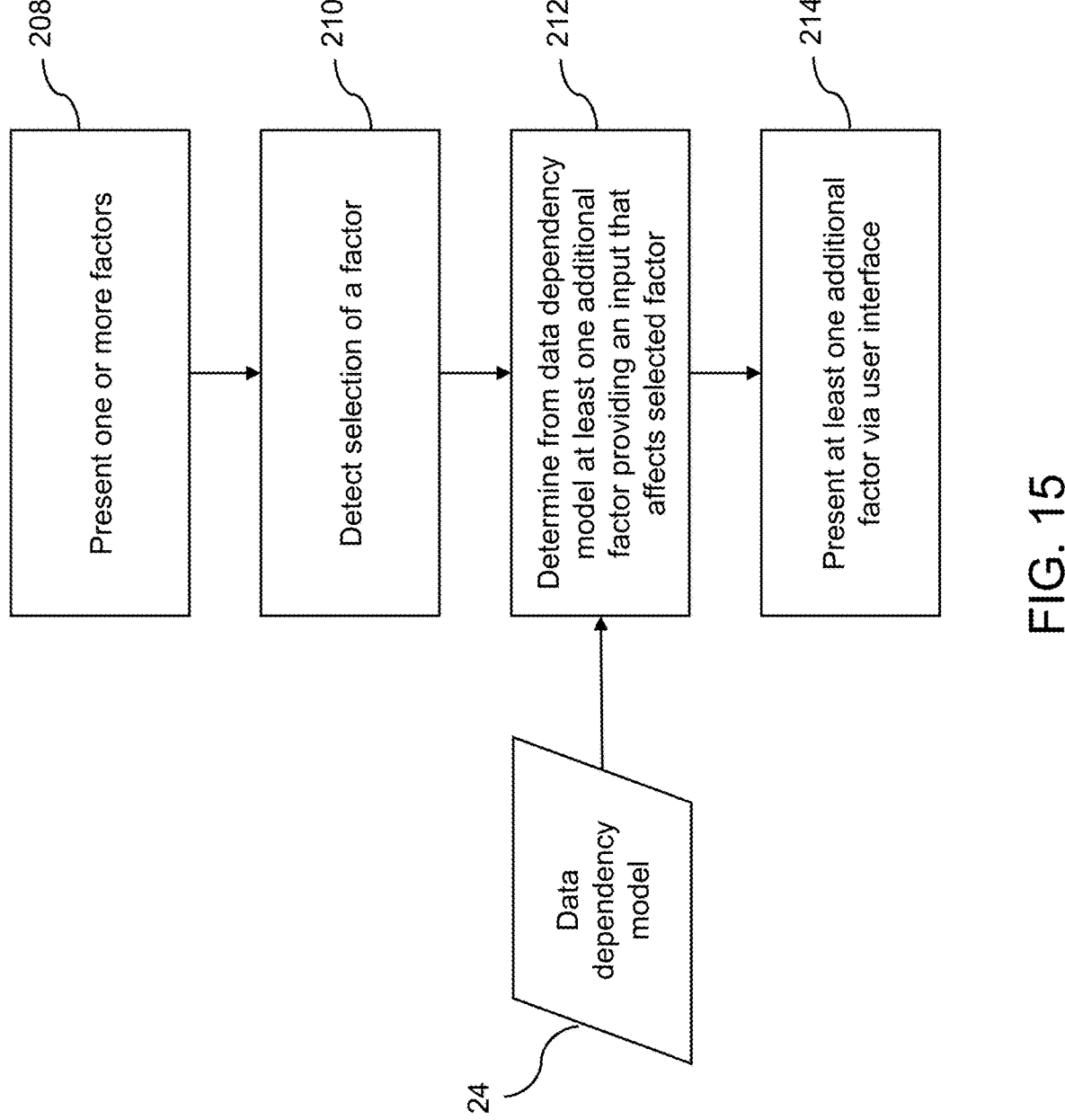
FIG. 15 is a flow chart illustrating example operations for displaying additional factors in response to selection of a factor displayed in a UI and using the data dependency model.

FIG. 15 illustrates operations that may be executed for displaying additional factors 70 in response to selection of a factor 70 displayed in a UI 32, e.g., as shown in FIG. 12. In this example, it may be assumed that the operations are executed within the environment of the UI 32, post development, however, it can be appreciated that similar operations may be performed by a user 18 (e.g., developer) within the UI development environment 12. At block 208, the UI 32 presents one or more factors 208, e.g., as shown in FIG. 12. This may include displaying a UI feature 22 along with one or more factor elements 86. At block 210, the computing device 50 presenting the UI 32 via an application 30 may detect selection of a factor 70, e.g., at step 1 in FIG. 12. At block 212, the application 30 having the UI 32 may determine, by accessing and referencing the data dependency model 24, at least one additional factor 70 that provides an input to, or otherwise influences or affects the values of the associated data 80 for that selected factor 70, e.g., at step 2 in FIG. 12 using drill-down element 88. At block 214, the application 30 may present at least one additional factor 70 via the UI 32, e.g., at step 2 in FIG. 12 wherein a factor preview element 90 is displayed in the drill-down element 88.

Figures 16, 17:
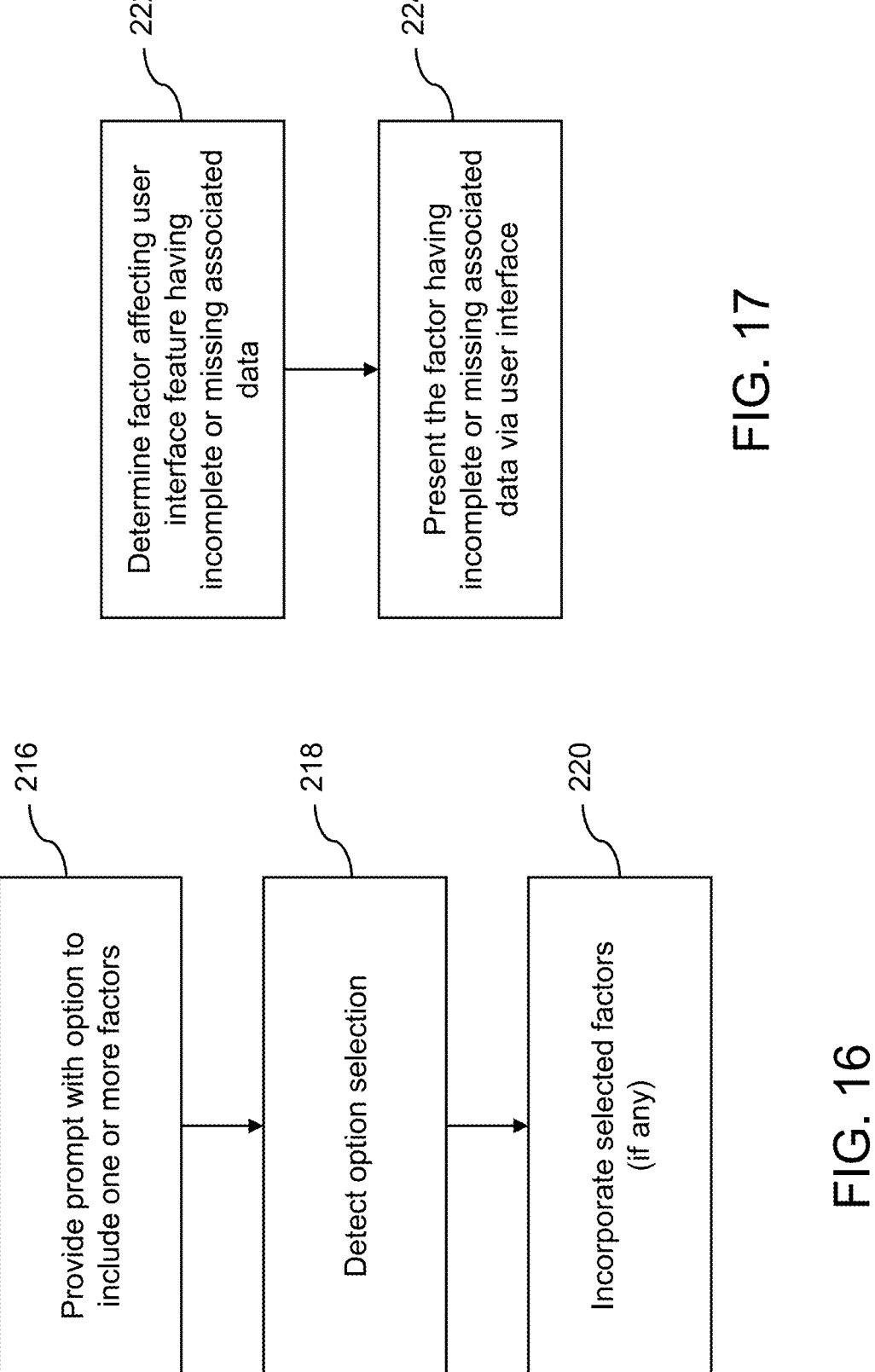
FIG. 16 is a flow chart illustrating example operations for providing a prompt with an option to include one or more factors and for responding to detection of a selection from the prompt.
FIG. 17 is a flow chart illustrating example operations for determining a factor affecting a UI feature that has missing or incomplete associated data and presenting such factor.

FIG. 16 illustrates operations that may be executed for providing a prompt 82 with an option (e.g., list 84 as shown in FIG. 10) to include one or more factors 70 (or links thereto) along with or in association with a UI feature 22. For illustrative purposes it is assumed that the operations shown in FIG. 16 are performed within the UI builder workspace 20, however, it can be appreciated that similar operations may be performed to enable a user 18 of a UI 32 to perform such operations, e.g., to reveal or surface factor elements 86 in an already developed UI 32. At block 216, the UI workspace builder 20 provides a prompt 82 with an option to include one or more factors 70, e.g., by providing a list 84 of factors 70 that provide inputs to or otherwise influence or affect the data associated with the UI feature 22. At block 218, the UI workspace builder 20 detects selection of the option, e.g., by selecting a factor 70 from the list 84 as shown in FIG. 10. At block 220, if any factors 70 are selected from the list 84, corresponding factor elements 86 may be added, e.g., as shown in FIG. 11.

As illustrated in FIG. 11, factors 70 may exist that, while be related to other factors 70 such as one associated with a UI feature 22, may in the specific circumstance have missing or incomplete data. FIG. 17 illustrates operations that may be executed to determine such a factor 70, e.g., as illustrated by factor element 86 for Factor B in FIG. 11. The operations shown in FIG. 17 may be executed within the UI development environment 12 or within an application usage environment, e.g., wherein user 18 interacts with UI 32 as shown in FIG. 2. At block 222, the UI builder workspace 20 or UI 32 determines that a factor 70 being surfaced or otherwise being linked or associated with a UI feature 70 or factor element 86 has incomplete or missing associated data 80. In response, at block 224, the UI builder workspace 20 or UI 32 may present the factor 70 having such missing or incomplete associated data 80 via the UI 32 or within the UI builder workspace 20 interactive area. This may include highlighting or flagging the factor 70 to alert the user 18 of the missing or incomplete associated data 80, which can be used to trigger a response or downstream action. For example, if the e-commerce software platform referred to above has not yet implemented a feature such as a loyalty program, then the factors 70 in the branch of the data structure associated with loyalty factors 70 may not be mapped to any underlying data values. Determining this from the UI 32, for example, may inform an analyst user 18 that a loyalty program, being an influential factor 70, may be considered for the merchant or related organization.

In addition to the operations illustrated in FIGS. 14-17, the data dependency model 24 may be used to provide additional features within either or both the UI builder workspace 20 and the UI 32. For instance, the relative importance of the factors 70 may be adjusted on a per-user (e.g., per-merchant) basis when considering the user-facing UI 32. That is, the UI 32 that is being designed and later used can adapt to different user types, organization types, or other characteristics, by adapting a data dependency model 24 or generating multiple domain-specific data dependency models 24.

It can be appreciated that when utilizing the data dependency model 24 in a design validator such as in the UI builder workspace 20, the UI development tools being used may analyze a new feature design to determine which underlying data is being used by the feature 22 and/or displayed to the user in a corresponding UI 32. This may be done by accessing and referencing the data structure that is used to represent the data dependency model 24 and enable a tool to programmatically identify which (if any) of the factors 70 may be surfaced in the UI 32 to complement the new feature 22 (e.g., other values or charts to be displayed along with a new graph being added) or to flag factors 70 that have not been considered in the feature design (e.g., a payments related feature that does not consider credit rating or fraud likelihood).

Any missing factors 70 may be flagged by the development tool, e.g., surfaced as a warning to the designer(s). For certain UIs 32 (e.g., a collection of reports on metrics), missing factors 70 may be automatically corrected by the system (e.g., by creating and inserting a new chart in the report for an identified missing metric).

The design validator used in the UI builder workspace 20 may also use the relative importance of factors 70 (both generic and specific to a merchant) to rank or prioritize factors 70 to consider or emphasize/de-emphasize factors 70 accordingly in the UI 32. Moreover, the data dependency model 24 may be created and stored centrally and be accessible to multiple endpoints in an organization, to provide a consistent mapping of factors 70 across all UIs 32 that are developed and would rely on data sets related to the data dependency model 24. The data dependency model 24 may be used during development (e.g., as a design validator) and/or by a UI 32 in real-time to surface factors 70 that are relevant to a UI feature 22 being displayed or interacted with. That is, the data dependency model 24 and factors data 26 may be accessed and processed in real-time during usage of a UI 32 to surface relevant data according to the feature(s) being interacted with by a user 18.

The systems described herein that utilize such data dependency models 24 may be configured for use in UIs 32 in various industries and applications, for example, utilities (e.g., monitoring a power grid or forecasting loads), health care, cloud computing, or e-commerce as illustrated below etc.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 18:
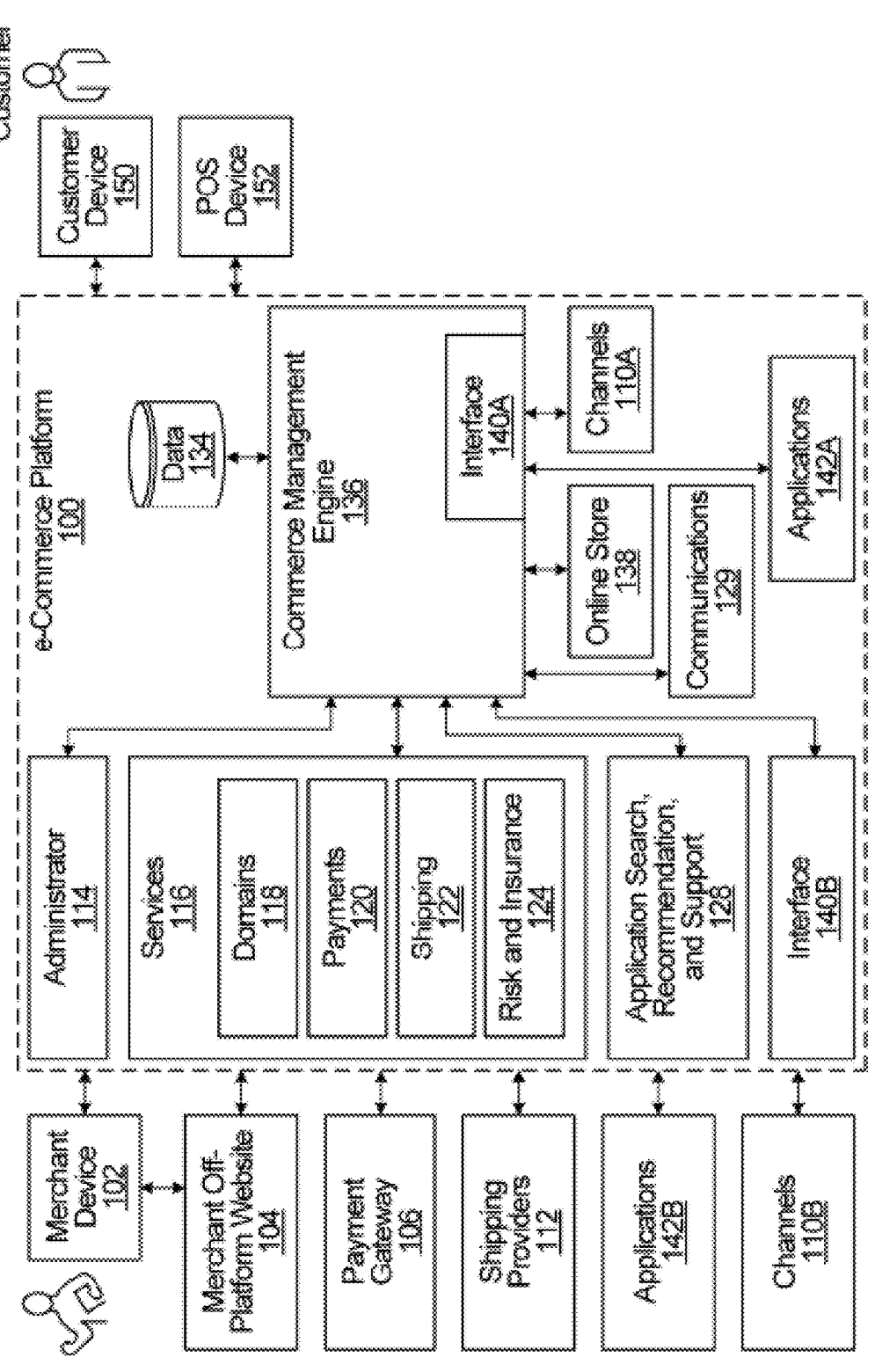
FIG. 18 is a block diagram illustrating an example of a configuration for an e-commerce platform.

FIG. 18 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 18, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 19:
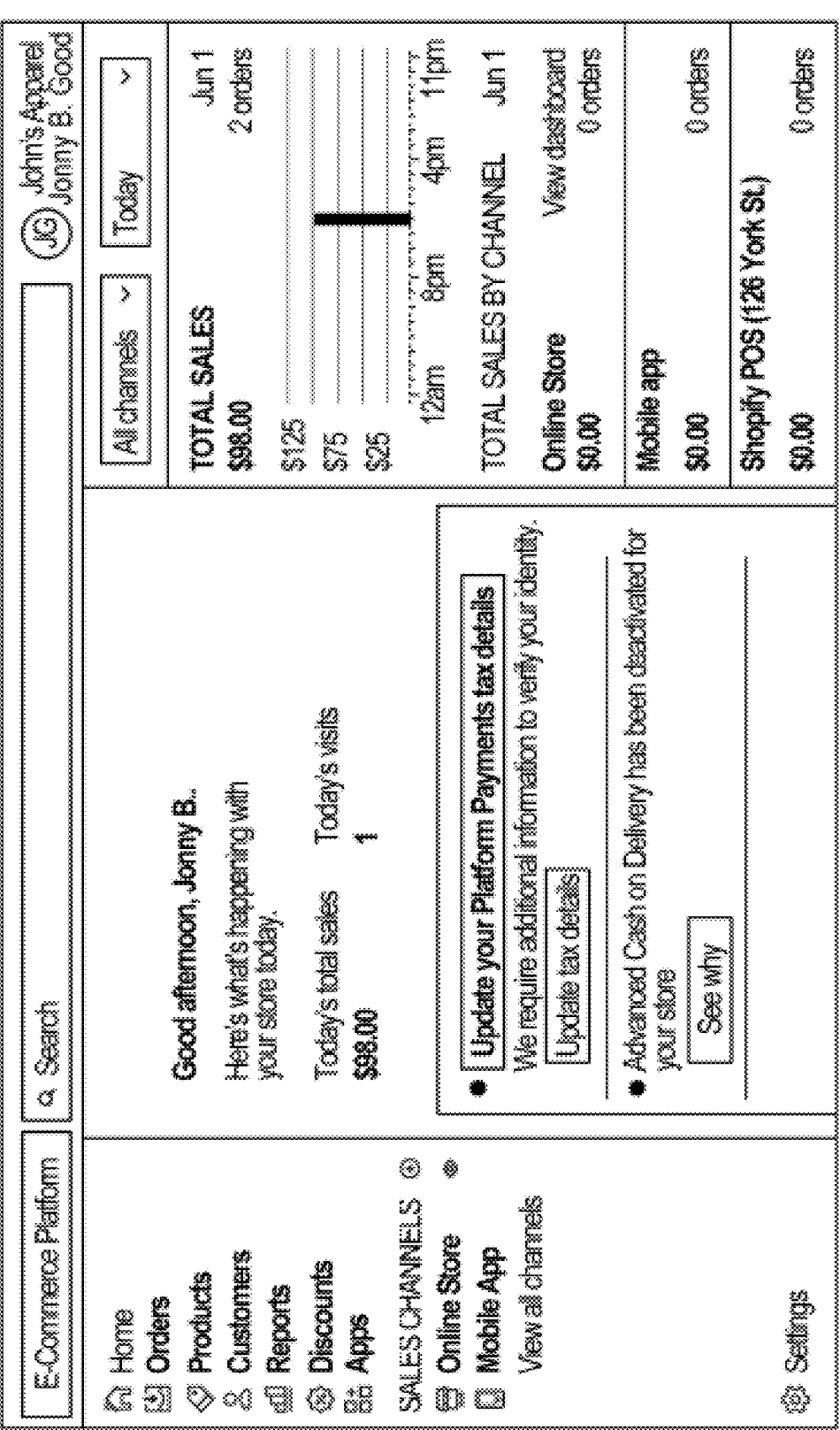
FIG. 19 shows an example of a user interface for interacting with the e-commerce platform shown in FIG. 18.

FIG. 19 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 19. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 18, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third party through an order risk API, and the like. Before proceeding to fulfillment, the merchant may need to obtain or capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date based ledger that records sale related events that happened to an item).

Implementation in an E-Commerce Platform

Figure 20:
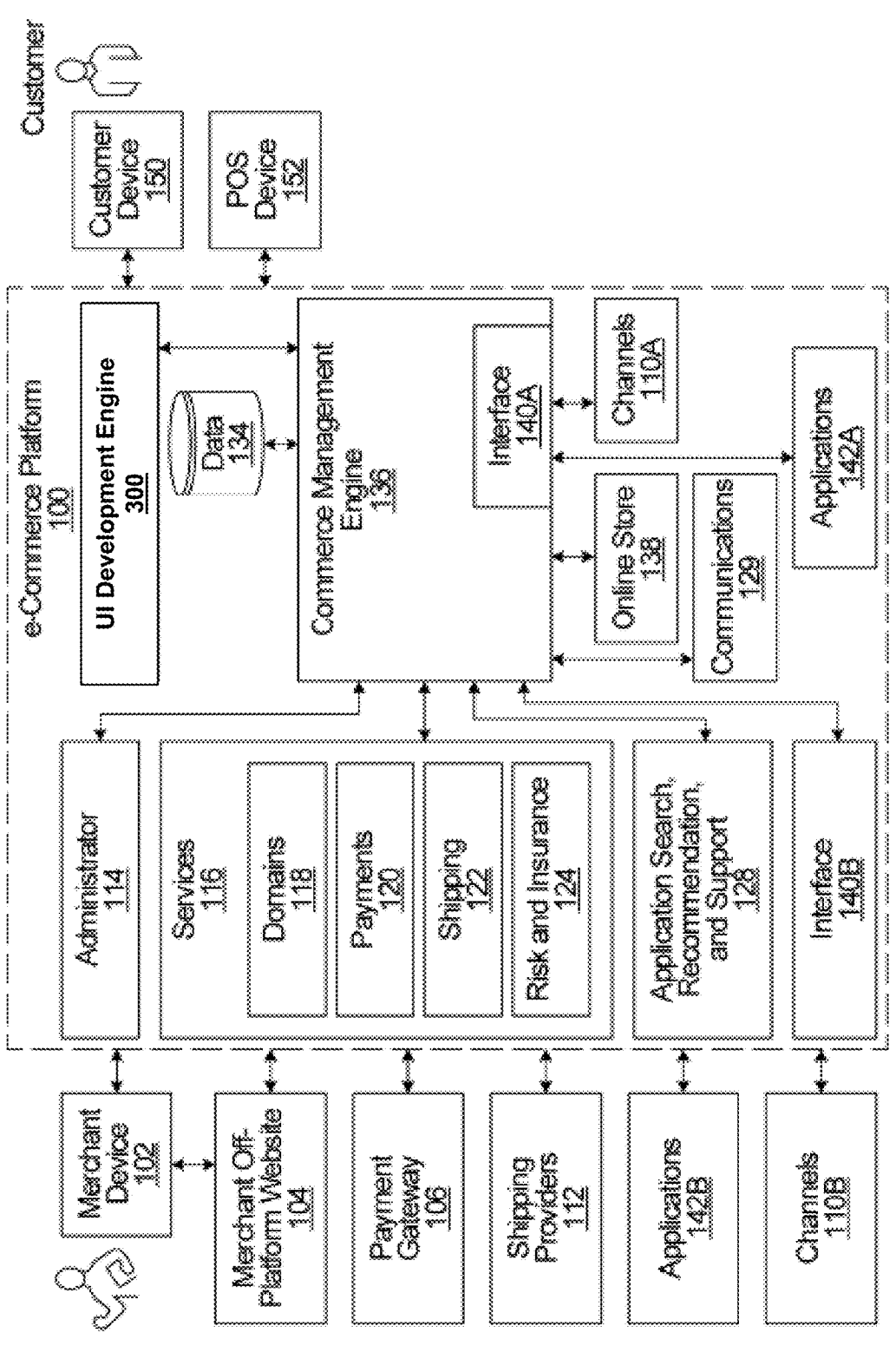
FIG. 20 is a block diagram illustrating an example of the e-commerce platform of FIG. 18 with an integrated administrator user interface engine.

The functionality described herein may be used in commerce to provide improved customer or buyer experiences. The e-commerce platform 100 could implement the functionality for any of a variety of different applications, examples of which are described elsewhere herein. FIG. 20 illustrates the e-commerce platform 100 of FIG. 18 but including a UI development engine 300. The engine 300 is an example of a computer-implemented system that implements the functionality described herein for use by the e-commerce platform 100, the customer device 150 and/or the merchant device 102. For example, the UI development engine 300 may be used to provide a UI builder workspace 20 for developing UIs 32 that may be used by merchants to visualize analytics data, e.g., as shown in FIG. 13.

Although the engine 300 is illustrated as a distinct component of the e-commerce platform 100 in FIG. 20, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the service provider application 28 and administrator UI controller 12 are implemented as an engine 300, coupled to the commerce management engine 136 and/or interface 140B to enable the administrator UI functionality to be integrated into an administrator UI 70 displayed by the administrator UI controller 12 to the merchant device 102, the customer device 150, or both.

The engine 300 could implement at least some of the functionality described herein, for example based on the examples shown in FIGS. 10 through 17. Although the embodiments described may be implemented in association with an e-commerce platform, such as (but not limited to) the e-commerce platform 100, the embodiments described below are not limited to e-commerce platforms.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, e-commerce platform 100, or engine 300, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:
in a user interface builder workspace used to create user interfaces for an application, during development of a user interface in the builder workspace, and prior to deployment of the user interface, detecting incorporation in the user interface of a user interface feature, the user interface feature being associated with particular data;
identifying, based on the particular data associated with the user interface feature, one or more factors affecting values of the particular data associated with the user interface feature using a data dependency model that models dependencies between factors, wherein the particular data corresponds to one of the factors, and wherein the data dependency model employs a directed-graph having nodes representing the factors, and edges of the directed-graph representing dependency relationships between the factors, wherein, for a given one of the factors, edges directed to a node representing that factor extend from nodes representing other factors that provide input used to determine values of that factor;
presenting the identified one or more factors in the user interface builder workspace as options to be added to the user interface;
receiving an input adding at least one of the one or more identified factors to the user interface; and
updating the user interface to include one or more user interface features associated with the at least one of the one or more identified.

2. The method of claim 1, further comprising:
displaying the user interface having the one or more user interface features and the one or more identified factors, in the application.

3. The method of claim 1, wherein the data dependency model is stored by an enterprise system and made available to a plurality of endpoints in the enterprise system.

4. The method of claim 1, wherein the one or more identified factors are presented in the user interface using corresponding additional user interface features.

5. The method of claim 1, wherein the one or more identified factors are presented as options to incorporate into the user interface using corresponding additional user interface features.

6. The method of claim 1, wherein the data dependency model comprises at least one direct factor determined by a mathematical relationship.

7. The method of claim 1, wherein the data dependency model comprises at least one indirect factor, and wherein the at least one indirect factor is determined from a model trained on inputs that influence the indirect factor.

8. The method of claim 1, wherein the one or more factors include a weight corresponding to a relative influence on how values of the associated data are affected by the data associated with the corresponding factor.

9. The method of claim 8, wherein weights are used to determine a priority of the one or more factors presented via the user interface.

10. The method of claim 1, further comprising:
determining that a factor affecting a corresponding one of the one or more user interface features has incomplete or missing associated data; and
presenting the factor having incomplete or missing associated data via the user interface.

11. The method of claim 10, wherein presenting the factor having incomplete or missing associated data comprises highlighting the factor in the user interface.

12. The method of claim 1, further comprising:
detecting selection of a factor of the one or more factors presented via the user interface;
determining, from the data dependency model, at least one additional factor providing an input that affects values of the associated data of the selected factor; and
presenting one or more of the at least one additional factor via the user interface.

13. The method of claim 1, wherein a priority of the identified one or more factors presented via the user interface is determined based on a user type.

14. The method of claim 1, wherein the user interface comprises analytics data related to an organization.

15. A system comprising:
a processor;
a display coupled to the processor;
at least one input device coupled to the processor; and
at least one memory, the at least one memory comprising processor executable instructions that, when executed by the at least one processor, causes the system to:
in a user interface builder workspace used to create user interfaces for an application, during development of a user interface in the builder workspace, and prior to deployment of the user interface, detect incorporation in the user interface of a user interface feature, the user interface feature being having associated with particular data;
identify, based on the particular data associated with the user interface feature, one or more factors affecting values of the particular data associated with the user interface feature using a data dependency model that models dependencies between factors, wherein the particular data corresponds to one of the factors, and wherein the data dependency model employs a directed-graph having nodes representing the factors, and edges of the directed-graph representing dependency relationships between the factors, wherein, for a given one of the factors, edges directed to a node representing that factor extend from nodes representing other factors that provide input used to determine values of that factor;

present the identified one or more factors in the user interface builder workspace as options to be added to the user interface;

receive an input adding at least one of the one or more identified factors to the user interface; and update the user interface to include one or more user interface features associated with the at least one of the one or more identified.

16. The system of claim 15, wherein the one or more identified factors are presented as options to incorporate into the user interface using corresponding additional user interface features.

17. The system of claim 15, further comprising processor executable instructions that, when executed by the at least one processor, causes the system to:

determine that a factor affecting a corresponding one of the one or more user interface features has incomplete or missing associated data; and present the factor having incomplete or missing associated data via the user interface.

18. The system of claim 15, further comprising processor executable instructions that, when executed by the at least one processor, causes the system to:

detect selection of a factor of the one or more factors presented via the user interface;

determine, from the data dependency model, at least one additional factor providing an input that affects values of the associated data of the selected factor; and present one or more of the one additional factor via the user interface.

19. The system of claim 15, wherein the one or more factors include a weight corresponding to a relative influence on how values of the associated data are affected by the data associated with the corresponding factor.

20. A non-transitory computer-readable medium comprising processor executable instructions that, when executed by a processor, cause the processor to:

in a user interface builder workspace used to create user interfaces for an application, during development of a user interface in the builder workspace, and prior to deployment of the user interface, detect incorporation in the user interface of a user interface feature, the user interface feature being associated with particular data;

identify, based on the particular data associated with the user interface feature, one or more factors affecting values of the particular data associated with the user interface feature using a data dependency model that models dependencies between factors, wherein the particular data corresponds to one of the factors, and wherein the data dependency model employs a directed-graph having nodes representing the factors, and edges of the directed-graph representing dependency relationships between the factors, wherein, for a given one of the factors, edges directed to a node representing that factor extend from nodes representing other factors that provide input used to determine values of that factor;

present the identified one or more factors in the user interface builder workspace as options to be added to the user interface;

receive an input adding at least one of the one or more identified factors to the user interface; and update the user interface to include one or more user interface features associated with the at least one of the one or more identified.

* * * * *